United States Patent
Hotson et al.

(10) Patent No.: US 11,704,912 B2
(45) Date of Patent: Jul. 18, 2023

(54) LABEL-FREE PERFORMANCE EVALUATOR FOR TRAFFIC LIGHT CLASSIFIER SYSTEM

(71) Applicant: FORD GLOBAL TECHNOLOGIES, LLC, Dearborn, MI (US)

(72) Inventors: Guy Hotson, Mountain View, CA (US); Richard L. Kwant, San Bruno, CA (US); Brett Browning, Pittsburgh, PA (US); Deva Ramanan, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 16/902,678

(22) Filed: Jun. 16, 2020

(65) Prior Publication Data

US 2021/0390349 A1  Dec. 16, 2021

(51) Int. Cl.
*B60W 40/04* (2006.01)
*B60W 60/00* (2020.01)
(Continued)

(52) U.S. Cl.
CPC ........... *G06V 20/584* (2022.01); *B60W 40/04* (2013.01); *B60W 60/0015* (2020.02);
(Continued)

(58) Field of Classification Search
CPC .. G06K 9/6262; G06K 9/6201; G06K 9/6256; G06K 9/628; G06V 10/776;
(Continued)

(56) References Cited

U.S. PATENT DOCUMENTS

| 7,630,807 B2 | 12/2009 | Yoshimura et al. |
| 8,762,006 B2 | 6/2014 | Miller |

(Continued)

FOREIGN PATENT DOCUMENTS

| CN | 106909937 A | 6/2017 |
| CN | 108304813 A | 7/2018 |

(Continued)

OTHER PUBLICATIONS

Cui, R. et al. "Multimodal Trajectory Predictions for Autonomous Driving Using Deep Convolutional Networks," In 2019 International Conference on Robotics and Automation (ICRA), May 20, 2019, pp. 2090-2096.

*Primary Examiner* — Anne Marie Antonucci
*Assistant Examiner* — Patrick M Brady
(74) *Attorney, Agent, or Firm* — Frank MacKenzie; Brooks Kushman P.C.

(57) ABSTRACT

A method is disclosed for evaluating a classifier used to determine a traffic light signal state in images. The method includes, by a computer vision system of a vehicle, receiving at least one image of a traffic signal device of an imminent intersection. The traffic signal device includes a traffic signal face including one or more traffic signal elements. The method includes classifying, by a traffic light classifier (TLC), a classification state of the traffic signal face using labeled images correlated to the received at least one image. The classification state controls an operation of the vehicle at the intersection. The method includes evaluating a performance of the classifying of the classification state generated by the TLC. The evaluation is a label-free performance evaluation based on unlabeled images. The method includes training the TLC based on the evaluated performance.

23 Claims, 17 Drawing Sheets

(51) Int. Cl.
  *G06F 18/22*      (2023.01)
  *G06F 18/214*     (2023.01)
  *G06F 18/2431*    (2023.01)
  *H04N 23/90*      (2023.01)
  *G06V 20/58*      (2022.01)
  *G06V 10/764*     (2022.01)
  *G06V 10/774*     (2022.01)
  *G06V 10/776*     (2022.01)
  *G06V 10/82*      (2022.01)
  *G06F 18/21*      (2023.01)

(52) U.S. Cl.
  CPC .... *B60W 60/0025* (2020.02); *B60W 60/0027* (2020.02); *G06F 18/214* (2023.01); *G06F 18/217* (2023.01); *G06F 18/22* (2023.01); *G06F 18/2431* (2023.01); *G06V 10/764* (2022.01); *G06V 10/776* (2022.01); *G06V 10/7753* (2022.01); *G06V 10/82* (2022.01); *H04N 23/90* (2023.01); *B60W 2420/42* (2013.01); *B60W 2555/60* (2020.02)

(58) Field of Classification Search
  CPC ............. G06V 10/778; G06V 30/1916; G06V 30/19167; G06V 30/302; G06V 20/584; G06V 10/75; G06V 30/19007; G06V 10/774; G06V 30/19147; G06V 10/764; G06V 30/19173; B60W 60/0015; B60W 60/0025; B60W 60/0027; B60W 40/04; B60W 2555/60; B60W 2420/42; H04N 5/247
  See application file for complete search history.

(56) References Cited

U.S. PATENT DOCUMENTS

| | | | |
|---|---|---|---|
| 9,014,905 | B1 | 4/2015 | Kretzschmar et al. |
| 9,368,026 | B1 | 6/2016 | Herbach et al. |
| 9,542,846 | B2 | 1/2017 | Zeng et al. |
| 9,604,585 | B2 | 3/2017 | Joyce et al. |
| 9,740,178 | B2 | 8/2017 | Debouk et al. |
| 9,862,364 | B2 | 1/2018 | Fairfield |
| 9,892,332 | B1 | 2/2018 | Wendel et al. |
| 10,061,313 | B2 | 8/2018 | Letwin et al. |
| 10,136,026 | B2 | 11/2018 | Kanai |
| 10,303,960 | B2 | 5/2019 | Hattori et al. |
| 10,325,166 | B2 | 6/2019 | Kwant et al. |
| 10,325,373 | B2 | 6/2019 | Kwant et al. |
| 10,339,669 | B2 | 7/2019 | Kwant et al. |
| 11,210,571 | B2 | 12/2021 | Kwant |
| 2007/0150196 | A1 | 6/2007 | Grimm |
| 2009/0060273 | A1 | 3/2009 | Stephan et al. |
| 2009/0174573 | A1 | 7/2009 | Smith |
| 2013/0211682 | A1* | 8/2013 | Joshi ................... G05D 1/0276 701/1 |
| 2016/0125246 | A1* | 5/2016 | Ryhorchuk ............ H04N 7/181 348/143 |
| 2016/0252905 | A1 | 9/2016 | Tian et al. |
| 2018/0112997 | A1 | 4/2018 | Fasola et al. |
| 2018/0373980 | A1* | 12/2018 | Huval .................... G01S 17/89 |
| 2019/0012551 | A1 | 1/2019 | Fung et al. |
| 2019/0122059 | A1 | 4/2019 | Zhou et al. |
| 2019/0332875 | A1* | 10/2019 | Vallespi-Gonzalez ....................... G06V 20/584 |
| 2019/0340450 | A1* | 11/2019 | Moosaei .................. G06T 5/007 |
| 2020/0086879 | A1 | 3/2020 | Lakshmi Narayanan et al. |
| 2020/0108806 | A1 | 4/2020 | Ben Shalom |
| 2020/0134379 | A1 | 4/2020 | Gaidon et al. |
| 2020/0135030 | A1* | 4/2020 | Krivokon ............. G06V 20/588 |
| 2020/0160699 | A1 | 5/2020 | Annapureddy et al. |
| 2020/0265709 | A1* | 8/2020 | Bush .................... G08G 1/0129 |

FOREIGN PATENT DOCUMENTS

| | | |
|---|---|---|
| WO | 2018009552 A1 | 1/2018 |
| WO | 2018201835 A1 | 11/2018 |
| WO | 2018223882 A1 | 12/2018 |

\* cited by examiner

LABEL-FREE PERFORMANCE EVALUATOR FOR TRAFFIC LIGHT CLASSIFIER SYSTEM

BACKGROUND

The document describes methods and systems that are directed to evaluating the performance of traffic light classifier systems, such as those used in autonomous vehicles and traffic infrastructure systems.

Traffic signal devices are critical to safe driving. They signal when it is the safe, legal, and appropriate time for vehicles to pass or enter certain intersections or other regions. For this reason, autonomous vehicles require the ability to accurately detect the various signal elements of the traffic signal devices and the states of each of those signal elements. Once determined, this information is used to accurately instruct the autonomous vehicles on how to react to a traffic signal device.

Autonomous vehicles require a mechanism to determine the states of traffic signals so that they may safely navigate intersections. The safety criticality of this task necessitates a scalable pipeline to evaluate its performance. The most obvious way to evaluate the performance of a traffic light classifier is to use data that a human has marked with the ground truth traffic light state. These labels can be compared to the output from the traffic light classifier when it is run on the same input data, and the performance can be evaluated in a number of ways. For example, the absolute number of incorrect classifications can be quantified and divided by the total number of classifications to give the error rate. The confidences of classifications for particular bulbs can also be evaluated to provide numbers such as average precision. Regardless of what numbers are ultimately reported, this approach has several issues.

For a number of reasons, environmental conditions and variations in traffic light configurations can cause certain classification errors. To minimize classification errors, labeling large amounts of image data has been proposed. This approach works for some traffic lights, but it becomes more complicated and difficult to scale when labeling large amounts of data. Additionally, processing labeled data for classifying a traffic light signal in real-time is computationally complex for real-time data analytics or machine learning algorithms. Thus, the vehicle's ability to make a navigational decision based on the state of a traffic light as received via real-time data becomes very short.

Therefore, for at least these reasons, a method to evaluate performance of a classifier that classifies states of a traffic signal device without labeled data is needed.

SUMMARY

In various embodiments, a method is disclosed for evaluating a classifier used to determine a traffic light signal state in digital images. The method includes, by a computer vision system of a vehicle, receiving at least one digital image of a traffic signal device of an imminent intersection. The traffic signal device includes a traffic signal face including one or more traffic signal elements. The method includes, by a processor, classifying, by a traffic light classifier (TLC), a classification state of the traffic signal face using labeled images correlated to the received at least one image. The vehicle uses the classification state to control an operation of the vehicle when approaching or at the intersection. The method includes, by the processor, evaluating a performance of the classifying of the classification state generated by the TLC. The evaluation is a label-free performance evaluation based on unlabeled images. The method includes, by the processor, training the TLC based on the evaluated performance.

In some embodiments, the intersection may include a plurality of traffic signal devices. Then the evaluating may include, by the processor: (i) detecting in a sequence of a plurality of digital images of the traffic signal device; (ii) disallowed sequences of the plurality of digital images having temporally inconsistent traffic light transitions for a performance evaluation period of time; (iii) calculating a number of the disallowed sequences of the temporally inconsistent traffic light transitions; (iv) calculating a total number of transition sequences of the plurality of digital images; and (v) normalizing the disallowed sequences relative to the total number of transition sequences. The training may include, by the processor, using the normalized disallowed sequences to train the TLC.

The at least one digital image may include at least one digital image from each camera of a plurality of cameras on-board the vehicle. The two or more of the cameras of the plurality of camera may include fields of view which overlap. Then the evaluating may include, by the processor, causing the TLC to assign a same classification state to each instantiation of each digital image of the traffic signal face from the two or more of the cameras having the overlapping fields of view.

The vehicle may be a first vehicle. Then the evaluating may include, by the processor: (i) detecting a second vehicle in proximity to the first vehicle, the second vehicle having an overlapping field of view (FOV) of the traffic signal device of the imminent intersection; (ii) receiving a communication from the second vehicle, the communication including information associated with a classification state classified by a TLC of the second vehicle; and (iii) comparing the classification state classified by the TLC of the first vehicle and the received classification state classified by the TLC of the second vehicle to determine whether errors exist in the classification state classified by the TLC of the first vehicle. The training may include, by the processor, using the results of the comparison to train the TLC.

In some embodiments, the evaluating may include, by the processor: (i) receiving a sequence of raw outputs of the TLC, the raw outputs are based on a set of digital images, each raw output corresponds to a respective one classification state; (ii) filtering the raw outputs of the TLC to effectuate smoothing out of high frequency state fluctuations in the raw outputs to create a filtered output representative of a frame-based state; (iii) comparing the classification state with the frame-based state; and (iv) in response to the comparing, identifying that at least one classification state of the sequence from the TLC is a classification error. The training may include, by the processor, using the at least one classification state identified as a classification error to train the TLC.

The intersection may include a plurality of traffic signal devices with redundant faces. Then the evaluating may include, by the processor, determining a fraction of time the redundant faces have inconsistent classification states during a performance evaluation period of time. The training may include, by the processor, using the determined fraction of time associated with the redundant faces of the intersection to train the TLC.

In some embodiments, the evaluating may include, by the processor: (i) determining whether the classification state by the TLC was an impermissible state transition; and (ii) identifying that the classification state was impermissible.

The training may include, by the processor, using the identified impermissible classification state to train the TLC.

In some embodiments, the impermissible state transition may include one of: (i) a red state and a prior classification state of the traffic signal device was a green state; (ii) a yellow state and a prior classification state of the traffic signal device was a red state; and (iii) a green state and a prior classification state of the traffic signal device was a yellow state.

The intersection may include a plurality of traffic signal devices with multi-light states. Then the evaluating may include, by the processor: (i) detecting that the classification state generated by the TLC is a multi-light classification state; (ii) determining multi-light state rules and locations of multi-light traffic signal devices; and (iii) detecting a classification error of implausible multi-light states by the TLC based on the determined multi-light state rules and the locations of multi-light traffic signal devices. The training may include, by the processor, using the detected classification error to train the TLC.

In some embodiments, the determining of the classification state is repeated for each imminent intersection of a plurality of intersections along a driven path of the vehicle. Then the evaluating may include, by the processor: (i) querying a vehicle log for each logged instantiation of the classification state and conditions associated with the classification state for those intersections passed through along the driven path; and (ii) determining those classification states in the vehicle log with at least one condition with low probability of classification. The training may include, by the processor, using the determined classification states with the low probability of classification to train the TLC.

In some embodiments, the TLC may determine the classification state based on a machine learning (ML) algorithm. Then the evaluating may include, by the processor: (i) tracking those digital images of the at least one digital image determined to have failed classification using the ML algorithm of the TLC, in response to evaluating the performance of the TLC; and (ii) generating label data for said those digital images with the failed classification for use in the classifying by the TLC.

In some embodiments, the classifying may be repeated for each intersection along a driven path of the vehicle. The classifying may create a plurality of classification states that may be generated by the TLC. Then the evaluating may include, by the processor, one or more of any of the following: (i) evaluating the plurality of classification states for temporally inconsistent traffic light transitions of the traffic signal face for a first performance evaluation period of time; (ii) evaluating the plurality of classification states stored in a vehicle log for those stored classification states with a low probability of classification; (iii) evaluating the plurality of classification states for a classification error of implausible multi-light states based on multi-light state rules and locations of multi-light traffic signal devices; (iv) evaluating the plurality of classification states for an impermissible state transition of the traffic signal face; (v) evaluating the plurality of classification states for a fraction of time redundant faces of a plurality of traffic signal devices of the intersection which have inconsistent classification states during a second performance evaluation period of time; or (vi) evaluating discrepancies between a respective one classification state of the vehicle relative to a respective one classification state of a second vehicle in proximity to the vehicle and the intersection, the discrepancies being based on captured digital images with overlapping fields of view from the vehicle and the second vehicle. The method may include, by the processor: fusing results of the evaluating (i)-(vi) of the performance of the TLC into one or more metrics; and providing the one or more metrics to a TLC trainer to refine training of the TLC.

The classification state of the traffic signal face may include a classification state selected from at least one operational state of: a green light state; a yellow light state; a red light state; a circular light state; a left arrow light state; a right arrow light state; a forward arrow light state; a flashing yellow light state; and a flashing red light state.

In some alternate embodiments, a system is disclosed that includes a computer vision system of a vehicle configured to receive at least one digital image of a traffic signal device of an imminent intersection. The traffic signal device comprises a traffic signal face including one or more traffic signal elements. The system includes one or more processors configured to classify, by a traffic light classifier (TLC), a classification state of the traffic signal face using labeled images correlated to the received at least one digital image. The classification state controls an operation of the vehicle at the intersection. The system includes one or more processors configured to evaluate a performance of the classifying of the classification state generated by the TLC. The evaluation is a label-free performance evaluation based on unlabeled images. The system includes one or more processors configured to train the TLC based on the evaluated performance.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

As described in the background section above, the performance of traffic light classifier systems can be evaluated by comparing classifier output against data that has been labeled. Labeling requires a human to look through large numbers of images or logged data and to assign ground truth states. In other words, labeled data requires a man-in-the-loop which can be relatively slow when compared to the processing speeds of computing devices. Because this task takes time, the data used to evaluate the traffic light network may be stale to the traffic light classifier system. Any changes to the traffic light classification pipeline that have taken place in the real world will take time to show up in the traffic light performance numbers. As a result, problems may persist with the traffic light classification pipeline on the vehicle before corrections to the performance are identified during evaluations.

An ideal dataset for classifying traffic lights may consist of an image characteristics for large number of labeled traffic lights covering a diverse range of conditions, locations, appearances, etc., which would take a substantial amount of time and money to produce. The practical implications of labeling this much data mean that inevitably the test sets used to evaluate the traffic light classifier may not completely cover the range of operating conditions in which a neural network or other machine learning algorithm is expected to perform. Consequently, there exists a possibility that there are hidden failure modes within a traffic light classifier system that are unknown until they are discovered while the vehicle is in operation, for example.

Traffic light classification errors may be particularly salient when vehicle operations expand to new geographic areas. In these scenarios, the autonomous vehicle may encounter situations that have not been explicitly considered during algorithm development or tested during release.

Figure 1:
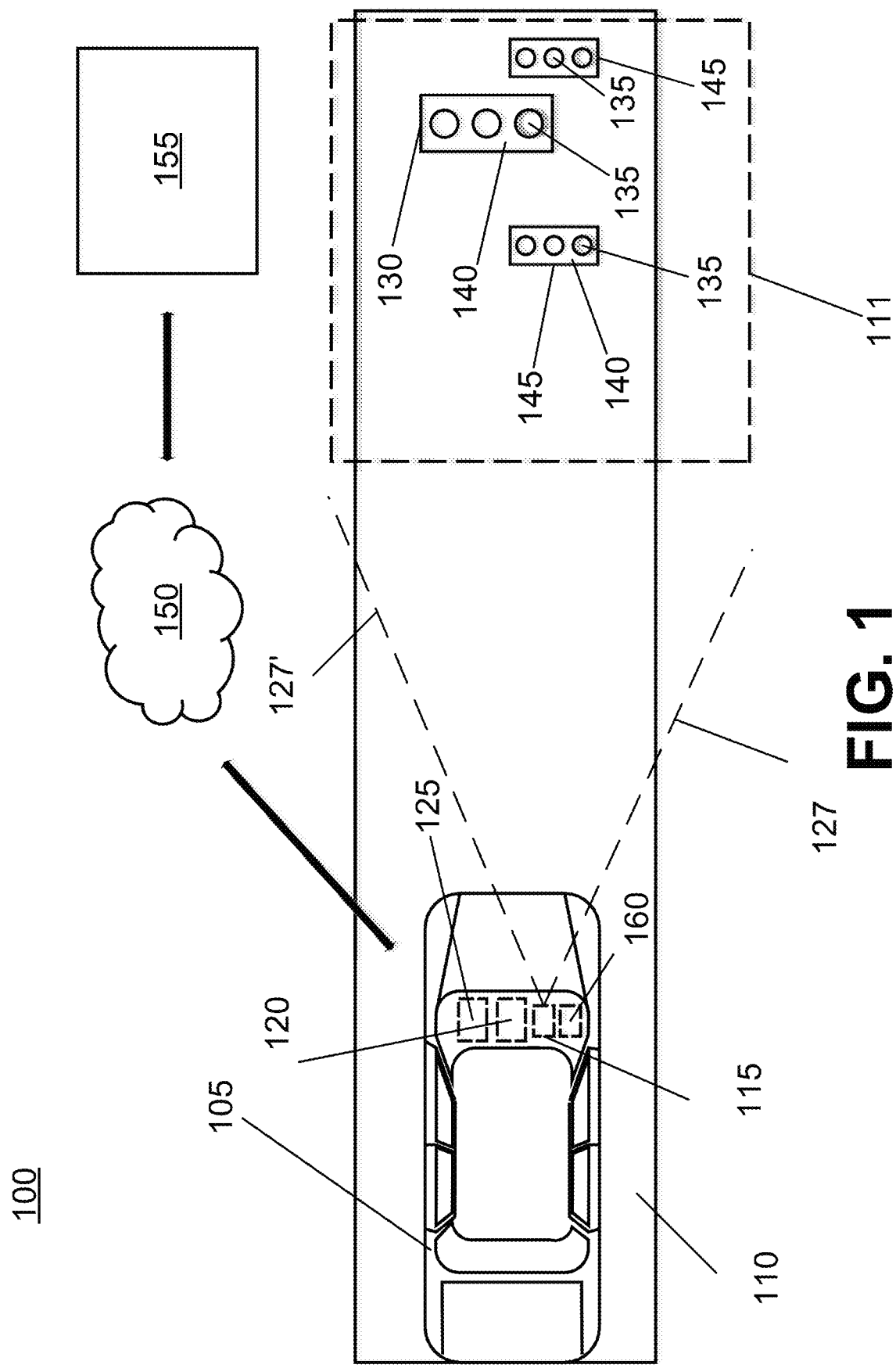
FIG. 1 illustrates an example system for identifying and classifying traffic signal devices, in accordance with various embodiments of the present disclosure.

Referring now to FIG. 1, a system 100 for identifying and classifying traffic signal devices 130 is provided. The term "traffic signal devices" 130 may be used interchangeably herein with the term "traffic light." The system 100 uses a label-free performance evaluator of the traffic light classifier system for refining traffic light classifier training.

Figure 3:
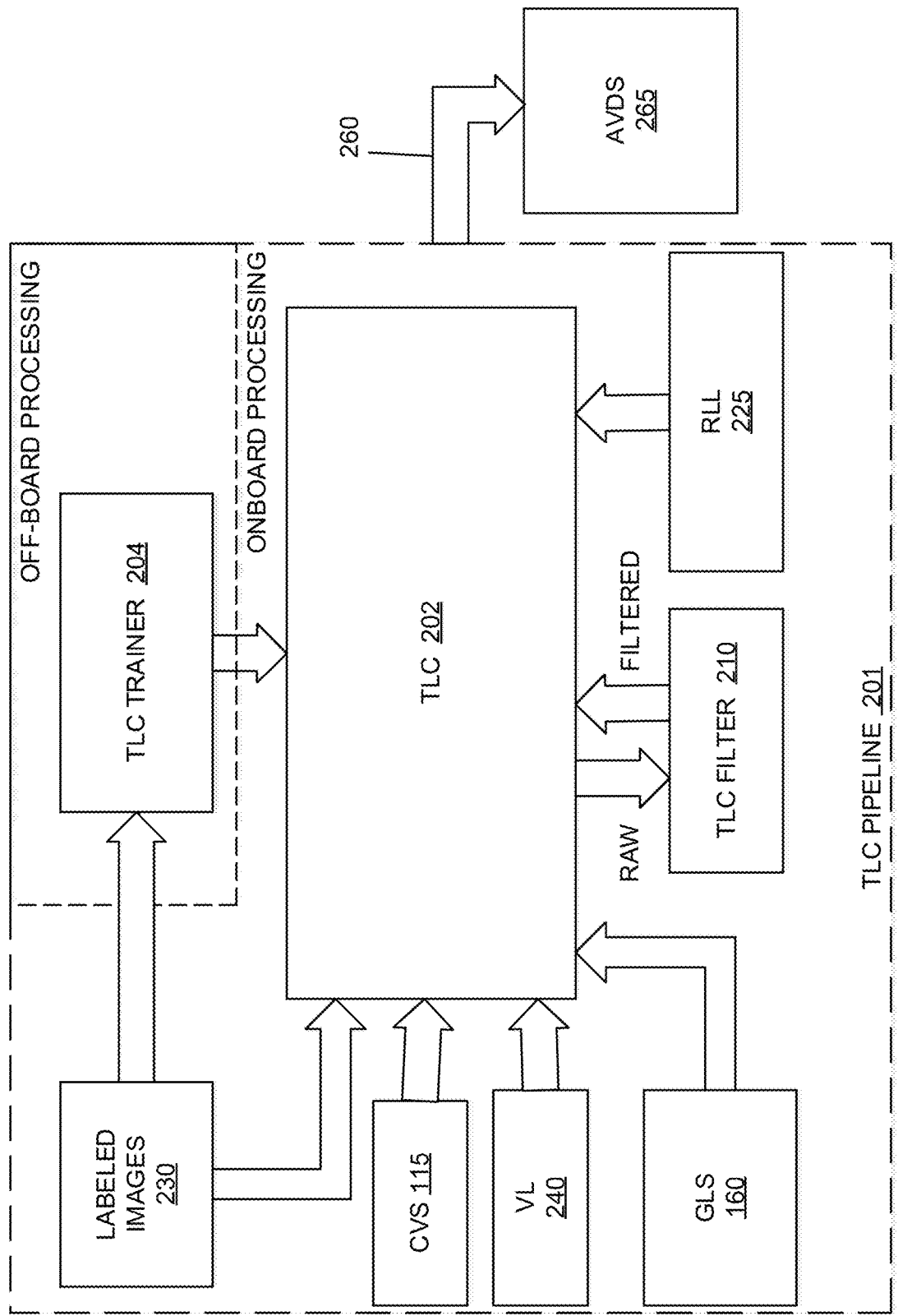
FIG. 3 illustrates an example block diagram the refined TLC pipeline of FIG. 2 with additional detail.
Figure 15:
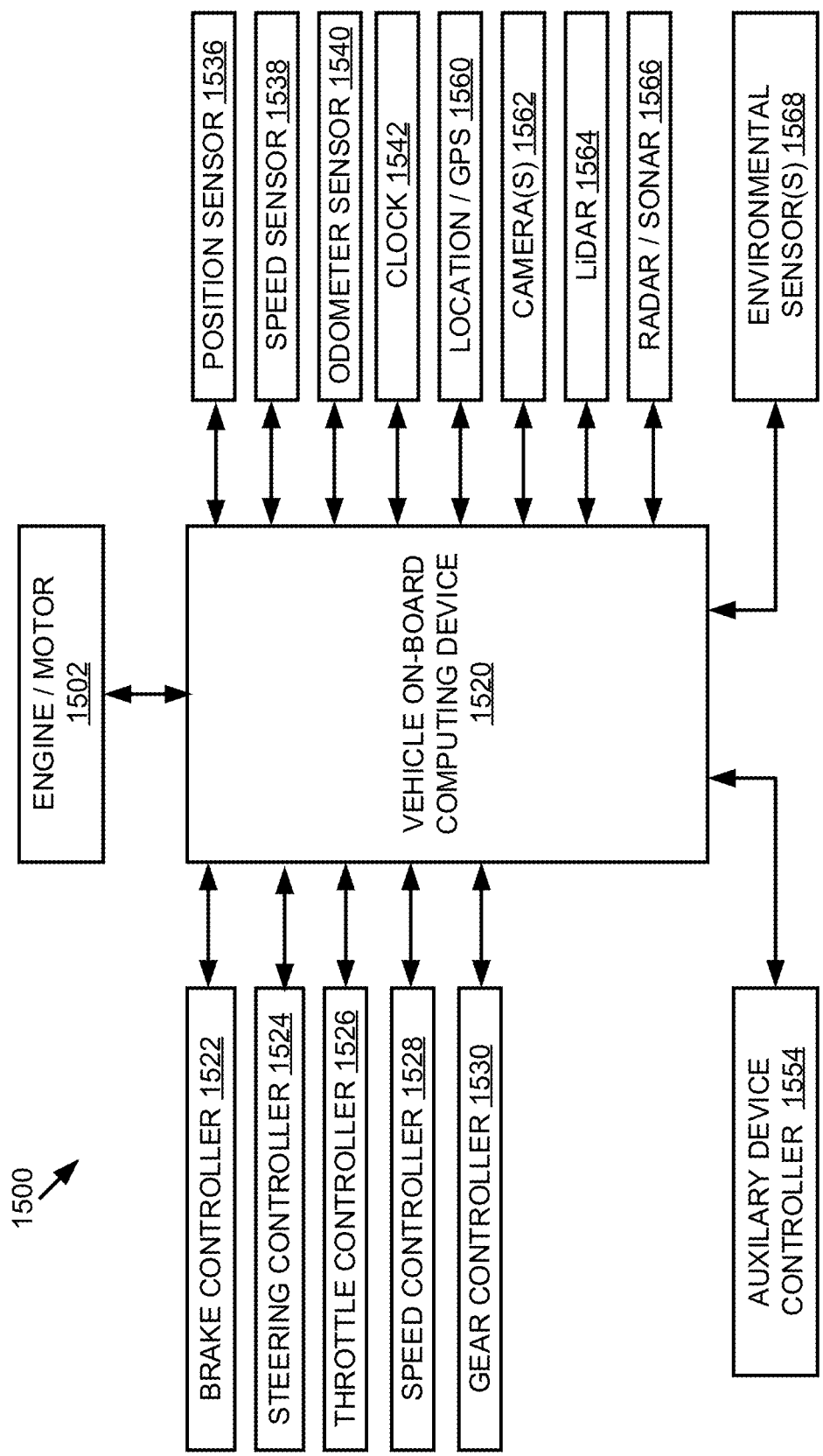
FIG. 15 illustrates example systems and components of an autonomous vehicle.

According to various embodiments, the system 100 may include a vehicle 105. According to various embodiments, the vehicle 105 is traveling on a road 110. It is noted, however, that any suitable path may be implemented. The vehicle 105 may include an autonomous vehicle driving system (AVDS) 265, as shown in FIG. 3. The AVDS 265 may control one or more of a braking system (not shown), engine system (not shown), and steering system (not shown) of the vehicle 105 in response to at least one control signal 260 representative of the classification state of the current instantiation of a traffic signal device 130. The braking system, engine system and steering systems are well known in the art. Thus, no further discussion will be provided. The AVDS 265 of FIG. 3, includes a system architecture 1500 as will be described in more detail in relation to FIG. 15. Some of the components of the TLC pipeline 201 may be shared with the system architecture 1500 to carry out other autonomous driving functions of the AVDS 265, for example. Some of the components of the TLC pipeline 201 may include programming instructions to carry out the functions described herein which may be executed by processor 125 (FIG. 1), the processor of server 155 (FIG. 1), or the processor of the vehicle on-board computing device 1520 (FIG. 15).

The system 100 may include a computer vision system (CVS) 115 incorporated into the vehicle 105 configured to receive a digital image of at least one traffic signal device 130. The at least one traffic signal device 130 is denoted in a dashed box labeled 111, herein after referred to as a "lane traffic light control 111." The road 110 and lane traffic light control 111 may be separate from the system 100 and part of the environment. The CVS 115 may include one or more cameras for capturing digital images of various features of the environment in which the vehicle 105 is traveling. Each camera includes a field of view (FOV) denoted by dashed lines 127 and 127' for the sake of illustration. Such captured features may include one or more traffic signal devices 130. The system 100 may include a remote CVS which is positioned in the environment, such as at a street corner, etc. The remote CVS may include at least one camera pointed at the traffic lights. The CVS 115 may include two or more of the cameras which have fields of view which are directed to the traffic signal devices and overlap. Embodiments of computer vision systems in the environment are included in the scope of this disclosure.

The system 100 may include a geographic location system (GLS) 160 configured to determine a location and orientation of the vehicle 105. The GLS 160 may include a Global Positioning System (GPS) device. It is noted, however, that other forms of geographic location may additionally, or alternatively, be used. The GLS 160 may be incorporated into the vehicle 105. The GLS 160 may include a software, firmware and/or hardware module that includes programming instructions that are configured to instruct a processor to determine a geographical location of the vehicle using processing resources that may be on-board.

The traffic signal device shown in FIG. 1 includes several traffic signal elements 135. The traffic signal elements 135 are dynamic in that they can be changed between at least two states to transmit traffic instructions to one or more drivers, and different types of signal elements 135 may be present in a single traffic signal device 130. Examples of traffic signal elements 135 may include, for example, a red light, a yellow light and a green light. Other examples include lights with directional arrows (such as arrows pointing left or right), other symbols (such as a symbol of a person walking), or words. In each of these examples, each light can be switched between an off state and an on state and flashing states. Lights may be Light Emitting Diodes (LEDs), bulbs, and/or any other suitable lighting element that conveys the state of each traffic signal element 135 of each traffic signal device 130 of an intersection, for example. According to various embodiments, the light may be reflective in nature.

The signal elements 135 may include circular lights and arrow lights. However, the features of each of the signal elements 135 may be any of various signal element features such as, for example, a green light, a yellow light, a red light, a circular light, a left arrow light, a right arrow light, an light having an arrow positioned in an arbitrary direction, a forward arrow light, a flashing yellow light, a flashing red light, a U-turn light, a bicycle light, an X-light, and/or any other suitable traffic signal element features. It is further noted that the traffic signal device 130 may include any suitable number of signal elements 135, having various positions on the face 140 of the traffic signal device 130. The traffic signal elements 135 correspond to a designated light fixture configured to transmit traffic instructions to one or more drivers. The classification state of the traffic signal face includes a classification state based on one or more operational states of: a green light state; a yellow light state; a red light state; a circular light state; a left arrow light state; a right arrow light state; a forward arrow light state; a flashing yellow light state; and a flashing red light state.

The system 100 may further include a transceiver 120 incorporated in the vehicle 105 and being configured to send and receive digital information from a remote server 155 via a wired and/or wireless connection such as, for example, through the cloud 150, where the vehicle 105 and the remote server 155 are in electronic communication with each other. The system 100 may further include a processor 125. The processor 125 may be configured to represent the traffic signal device 130 as a raster image in which each traffic signal element 135 of the traffic signal device 130 may be represented by a mask corresponding to a location of the traffic signal element 135 on the traffic signal device 130. It is noted that the processor 125 may be a standalone processor, the vehicle's processor, and/or the remote server's processor. Data processed by the processor 125 may be data received from the vehicle 105, received from the remote server 155, and/or a combination of data from the vehicle 105 and the remote server 155. However, for the sake of illustration, the processor 125 is represented incorporated in the vehicle 105. The vehicle 105 may include a standalone processor (e.g., processor 125) and/or at least one separate vehicle processor.

When determining the safety of the system 100 for an autonomous vehicle 105, one primarily considers traffic light classification errors that control the operation of the vehicle 105 at an intersection, for example. An instance of a traffic light classification error may cause human injury or a fatality, in response to the system 100 classifying a red light as a green light in the lane traffic light control 111. By way of non-limiting example, the green light classification may produce a vehicle acceleration/speed control signal to the speed controller 1528 (FIG. 15) representative to proceed with a level of acceleration by the vehicle 105 through the intersection. As a result, such progress through the intersection may cause a collision of the vehicle 105 with another vehicle or pedestrian. Such traffic light classification errors are usually rare by design, so quantifying the likelihood of these rare errors is also difficult. Because they are infrequent, classification errors require large amounts of labeled data to identify, and most of the effort labeling data is spent labeling data for which there was no problem.

Traffic light classification errors may often result from the accumulation of many smaller errors. For example, for the vehicle 105 to proceed through a red traffic light, the traffic light classifier must consistently classify the red light as green. While this classification mistake sometimes occurs, it is much more likely that the traffic light classifier will output a series of states that flicker between red states and green states, or that predict a green state at a low confidence. Moreover, most intersections have multiple traffic lights that indicate this same information. This design helps to ensure that drivers notice traffic lights as they approach intersections, but it also means that autonomous vehicles have multiple sources of truth which should be consistent with one another. In the above example, it is much more likely that the vehicle will incorrectly classify one red traffic light face 140 as green rather than two faces at the same time. The system 100 is configured to identify traffic light faces with the same information by using map information known ahead of time.

While lesser errors happen more frequently, they are also easier to identify than errors in traffic light classification that affect the performance of the vehicle 105. Accordingly, the system 100 is configured to identify flickering states by analyzing the frequency of traffic light state transitions and identify traffic light faces with inconsistent states. These features, and several others, are integrated into a suite of performance evaluations to describe traffic light performance without any labeled data.

Figure 2:
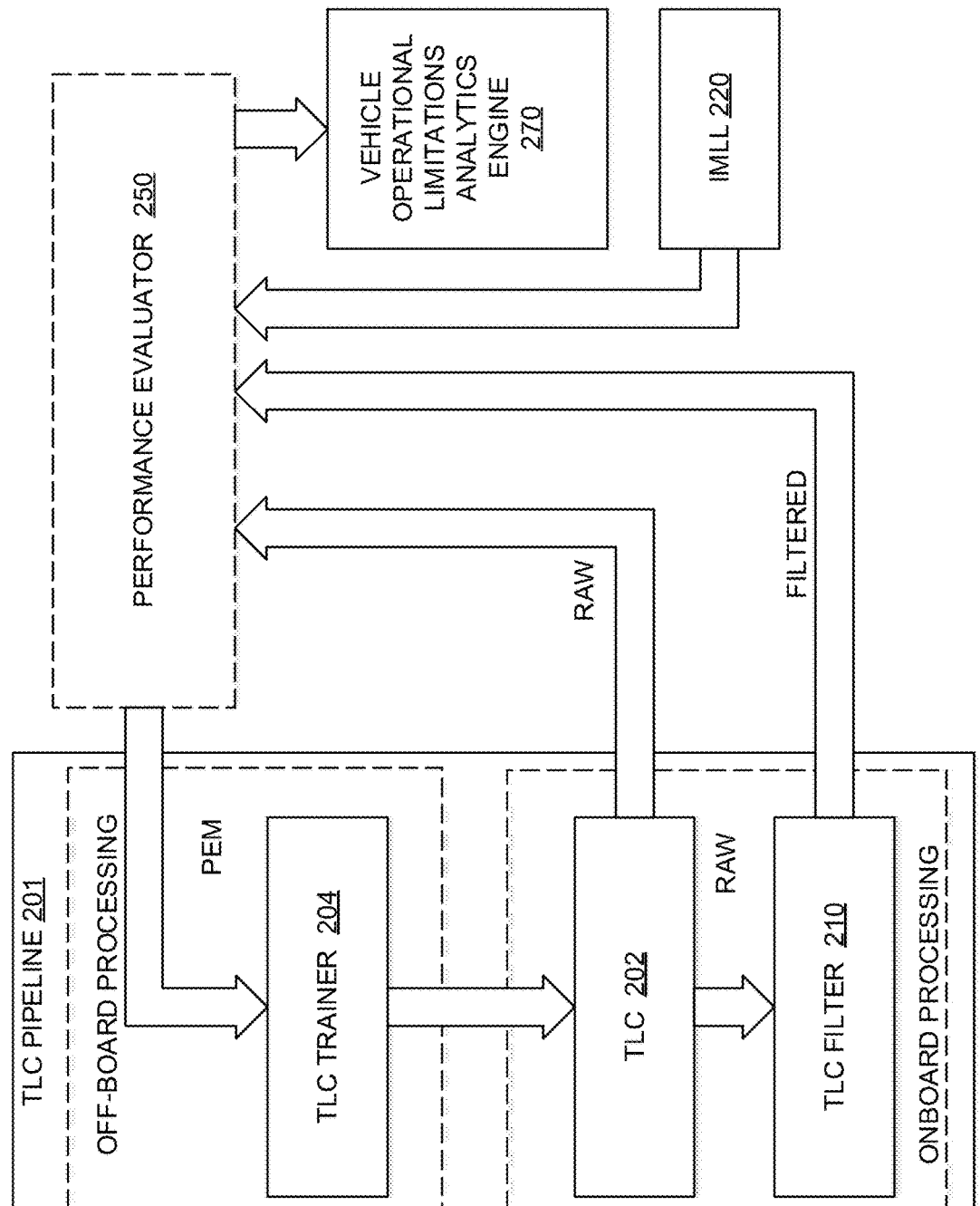
FIG. 2 illustrates an example block diagram of a refined traffic light classifier (TLC) pipeline using to using a label-free performance evaluator.

FIG. 2 illustrates an example block diagram of a refined traffic light classifier (TLC) pipeline 200 using a label-free performance evaluator 250 for refined traffic light classification in the TLC pipeline 201. The refined TLC pipeline 200 may include TLC pipeline 201, described in more detail in FIG. 3. In the illustration, for the sake of brevity only the TLC 202, TLC trainer 204 and TLC filter 210 are shown. Other features of the TLC pipeline 201 interacting with a label-free performance evaluator 250 will be described in more detail later in relation to FIGS. 4-6 and 8-14. The refined TLC pipeline 200 may include a vehicle operational limitations analytics engine 270. The analytics engine 270 may receive information from the performance evaluator 250 which may be analyzed to determine the vehicle's ability to navigate through a traffic light intersection, based on one or more of the performance evaluation results. The engine 270 may use machine learning algorithms to analyze the results of the performance evaluator 250. The analytics engine 270 may include a software, firmware and/or hardware module that includes programming instructions that are configured to instruct a processor to analyze at least one performance evaluation metric or trend of the performance evaluation metric to determine if such metric value or metric trend represents a vehicle's operational limitation to safely (i.e., without collision or without breaking a traffic law) navigate through a traffic signal intersection.

In FIG. 2, the performance evaluator 250 may include a software, firmware and/or hardware module that includes programming instructions that are configured to instruct a processor to generate at least one performance evaluation metric (PEM) to the TLC trainer 204 to refine the training processes of the TLC trainer 204 to train the TLC 202, for example, as will be described in more detail below. The TLC trainer 204 may include a software, firmware and/or hardware module that includes programming instructions that are configured to instruct a processor to train the TLC 202 as described in more detail later. The processing resources of the TLC trainer 204 may include off-board processing resources. The TLC 202 may include a software, firmware and/or hardware module that includes programming instructions that are configured to instruct a processor to classify a light bulb state or traffic light signal state using processing resources that may include on-board processing resources. The TLC filter 210 may include a software, firmware and/or hardware module that includes programming instructions that are configured to instruct a processor to filter the raw classification states from the TLC 202 using processing resources that may be on-board.

The PEM is based on classification of data which is label-free. The PEM may be used to train the TLC 202 via the TLC trainer 204 based to performance evaluation of the classification processes for traffic light impossible and/or implausible errors, for example. The performance evaluations by the performance evaluator 250 may be used to detect malfunctioning of the lane traffic light control 111 of an intersection, in some instances. For example, a malfunctioning lane traffic light control 111 of an intersection may be caused to flash yellow lights until the cause of the malfunction of the lane traffic light control 111 is repaired. In other instances, a flashing yellow light of a lane traffic light control 111 is the normal classification state. Likewise, a lane traffic light control 111 of an intersection may be caused to flash red until the cause of the malfunction of the lane traffic light control 111 is repaired. The IMLL 220 may include location data of implausible multi-lights stored in memory devices. The location data of implausible multi-lights may be accessed by the performance evaluator 250. The IMLL 220 will be described in more detail in relation to FIG. 12.

The PEM may be used to train the TLC 202 via the TLC trainer 204 based on the performance evaluations of the classification processes for various reasons. One or more of reasons to train the TLC 202 may be to capture business intelligence to understand the operational capabilities of the vehicle; to collect data to identify hard to find instances of misclassified cases that can be used during training; and to find novel or unique failure modes that need to be addressed with algorithmic changes.

Referring now to FIG. 3, an example block diagram of a traffic light classifier (TLC) pipeline 201 is shown. The TLC pipeline 201 may include a TLC 202 configured to classify at least one the signal elements 135 of a traffic light device 130, 145 associated with the lane traffic light control 111 of an intersection. The TLC 202 may include a set of programming instructions stored in memory which when executed by a processor (e.g., processor 125) performs the traffic light classification functions described herein using machine learning algorithms. The TLC 202, TLC trainer 204 and TLC filter 210 may include a software, firmware and/or hardware module that includes programming instructions that are configured to instruct a processor to perform the functions of classifying, training and filtering, as described herein.

The TLC pipeline 201 may be configured to produce a control signal 260 representative of the classification state of the current instantiation of a traffic signal device 130 to control an operation of the vehicle 105 through an intersection based on the lane traffic light control 111. The classification state of the control signal 260 may be used to generate a signal by the vehicle on-board computing device 1520 to control the level of acceleration/speed of the vehicle 105 relative to an intersection via a speed controller 1528 of FIG. 15. For example, if the signal elements 135 is classified as a red light, the vehicle 105 may be caused to brake to stop. In other words, the control signal 260 may be sent to the vehicle on-board computing device 1520 to generate a signal by the brake controller 1522 of FIG. 15. The brake controller 1522 is configured to control the braking system of the vehicle 105 which in turn causes the wheels of the vehicle 105 to alter the revolutions per minute (RPM).

In another example, the TLC 202 may classify a traffic light to include a green arrow in the direction representative of the vehicle's predicted next turn. Thus, the control signal 260 may be sent to the vehicle on-board computing device 1520 to generate a control signal by the steering controller 1524 of FIG. 15. The steering controller 1524 is configured to control the AVDS 265 of the vehicle 105 which in turn causes the vehicle 105 to make a turn at the intersection in the direction of the green arrow. In response to a control signal 260 representative of the classification state of traffic signal device 130, the vehicle on-board computing device 1520 may also cause some level of de-acceleration which would include corresponding control inputs to the speed controller 1528 and/or brake controller 1522. In response to a control signal 260 representative of the classification state of traffic signal device 130, the vehicle on-board computing device 1520 may need to send controls to the gear controllers 1530 and/or the throttle controller 1526.

The TLC pipeline 201 may include a TLC trainer 204 to train the TLC 202. The TLC pipeline 201 may include labeled images 230 which may be used to train the TLC trainer 204. In some embodiments, the TLC pipeline 201 includes an onboard processing TLC pipeline section and an off-board processing TLC pipeline section. Typically, the computational resources for the execution of the programming instructions for the training process may occur off-board in the off-board processing TLC pipeline section. However, computational resources for the execution of the programming instructions for the traffic light classifier and the state tracker are performed onboard using the onboard processing TLC pipeline section, as best seen in FIG. 3. Still further, the training process may include an in-the-loop sub-training process to be performed onboard using the onboard processing TLC pipeline section, in an embodiment.

The TLC pipeline 201 may include the computer vision system (CVS) 115 where the images captured by the computer vision system 115 are classified by the TLC 202. In some embodiments, the CVS 115 may capture a set of images in a sequence. The CVS 115 may include a software, firmware and/or hardware module that includes programming instructions that are configured to instruct a processor to capture the set of images in the sequence and may perform feature extraction for use by the TLC 202. The CVS 115 may include on-board processing resources. In some embodiments, a redundant light locator (RLL) 225 may be included in the TLC pipeline 201. The RLL 225 will be described in more detail in relation to FIG. 8. The TLC pipeline 201 may include traffic light filter 210 as will be discussed in more detail in relation to FIG. 6. The RLL 225 may include location data of redundant lights stored in memory devices. The RLL 225 may include a software, firmware and/or hardware module that includes programming instructions that are configured to instruct a processor to locate redundant lights using processing resources that may be on-board.

The TLC pipeline 201 may include a vehicle log (VL) 240 which logs vehicle event data in response to the operation of the vehicle 105. The VL 240 may receive one or more inputs from sensors as will be described in relation to the system architecture 1500 of FIG. 15. The VL 240 may log traffic light classification by the TLC 202, the time of day from clock 1542 (FIG. 15), at least one image captured associated with the lane traffic light control 111 of an intersection, camera settings of the CVS 115, real time vehicle information or environmental information from environmental sensors 1568 (FIG. 15) used to in the traffic light classification decision process of a particular traffic light classification instantiation. The vehicle log 240 may include information from the performance evaluator.

In order for the system 100 to ascertain the state of the signal elements 135 of a traffic signal device 130, such as that shown in FIG. 1 and/or any other relevant traffic signal device 130, the system 100 may determine one or more of the signal elements 135 of the traffic signal device 130, the position of one or more of the signal elements 135 on the face 140 of the traffic signal device 130, and the state of each of the signal elements 135 of the traffic signal device 130.

According to various embodiments, in order to classify the signal elements 135 of the traffic signal device 130, the traffic signal device 130 may be represented as a simplified two-dimensional image with at least one or more image color channels, where the signal elements 135 of the traffic signal device 135 correspond to discrete regions of pixels within the two-dimensional image. According to various embodiments, each image color channel corresponds to a unique color. Therefore, in the two-dimensional image, the signal elements 135 that are separated in space on the face of the actual traffic signal device 130 are analogously separated in space on the two-dimensional image representation of the traffic light face. This spatial separation in the two-dimensional raster image signifies that the TLC 202 is able to represent an arbitrary number of signal elements 135 with an arbitrary number of color and type combinations.

According to various embodiments, the system 100 may further be configured to represent each mask in a channel in the raster image, in which the channel representing each mask corresponds to one or more features of each of the traffic signal elements 135. The features may include the shape of the signal elements 135, the colors of the signal elements 135, whether any blinders are present, the angle of the face of the traffic signal device 130, and/or any other suitable features that aid in the classification of the signal elements 135 of the traffic signal device 130.

In addition to the spatial location, the raster image can indicate the colors and types of each signal element 135. It does so by representing different colors and types of signal element 135 as different channels. For example, green, yellow, and red lights may correlate to channels 0, 1 and 2, and circular lights, straight arrow lights, right arrow lights, and left arrow lights may correspond to channels 3, 4, 5, and 6. It is noted, however, that the features of the signal elements 135 and the colors, shapes, and channels used may be of any suitable type and number. According to various embodiments, one or more scalar values such as, for example, the angle of the face of the traffic signal device 130, may be represented as one or more scalar values in a particular channel.

The TLC pipeline 201 may include location data from the GLS 160 where classification of traffic light states may be location dependent. For example, a location may include a certain type of traffic light face or bulb type that may require different set of trained data and/or labeled data. The location data may be stored in the VL 240, by way of non-limiting example.

Figure 4:
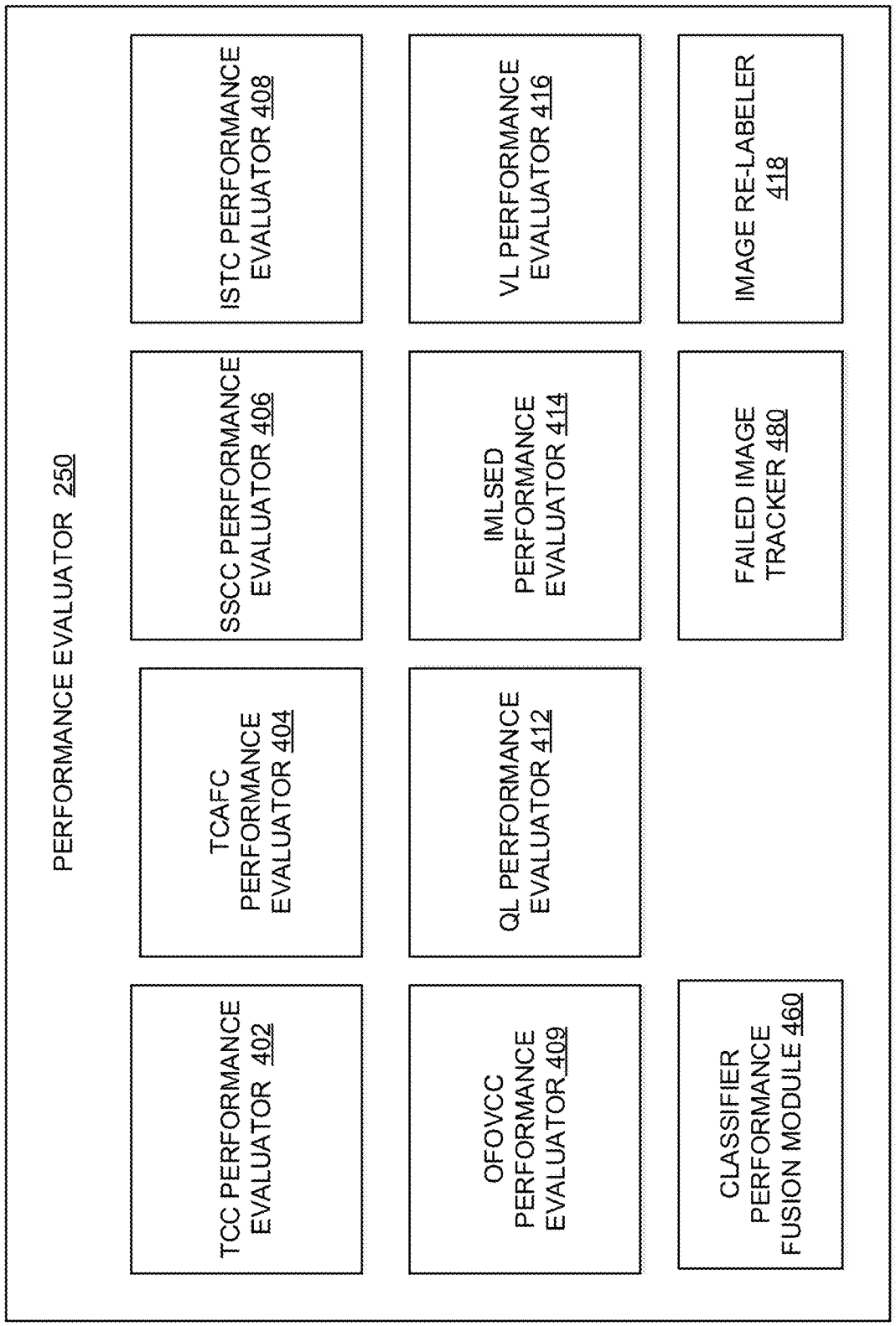
FIG. 4 illustrates an example block diagram of a performance evaluator.

FIG. 4 illustrates an example block diagram of a performance evaluator 250. The performance evaluator 250 may extract or receive information from the TLC pipeline 201 which is evaluated using data analytics, in some instances. The performance evaluator 250 may extract or receive information from the TLC pipeline 201 which is evaluated based on correlating the pipeline output with Manual on Uniform Traffic Control Devices (MUTCD), in some instances. The performance evaluator 250 may extract or receive information from the TLC pipeline 201 for compliance based on traffic light type and traffic light face, for example. The performance evaluator 250 employs label-free data to conduct a performance evaluation such that labeled images may be re-labeled for refined training of the TLC pipeline 201. The performance evaluator 250 may use mapping and other information for conducting performance evaluations.

The software, firmware and/or hardware module that includes programming instructions for performing the functions of the performance evaluator 250 may include sub-modules of software, firmware and/or hardware that includes programming instructions for performing functions described herein for at least one of a temporal consistency classifying (TCC) performance evaluator 402, a temporal consistency after filter classifying (TCAFC) performance evaluator 404, a same-state consistency classifying (SSCC) performance evaluator 406, an impermissible state transition classifying (ISTC) performance evaluator 408, an overlapping FOV consistency classifying (OFOVCC) performance evaluator 409, a quantization loss (QL) performance evaluator 412, an implausible multi-light states error detector (IMLSED) performance evaluator 414, a vehicle log (VL) performance evaluator 416, a classifier performance fusion module 460, a failed image tracker 480, and an image re-labeler 418, each of which will be described in detail below.

The performance evaluator 250 may include instructions which when executed by the one or more processors, causes the evaluation of the performance of the classification generated by the TLC. At any instantiation, the classification state evaluated by the performance evaluator 250 may only require evaluation for one performance metric, as appropriate. Nonetheless, evaluation for one or more performance metric may be appropriate. In such an instance, each evaluation may be performed simultaneously by the performance evaluator 250, in some examples.

The evaluation of the performance may include one or more of: evaluating temporally inconsistent traffic light transitions of the traffic signal face for a performance evaluation period of time; evaluating the classification states with the low probability of classification based on conditioned data in a vehicle log of the vehicle; evaluating a classification error of implausible multi-light states by the TLC based on multi-light state rules and locations of multi-light traffic signal devices; evaluating an impermissible state transition of the traffic signal face; evaluating a fraction of time redundant faces of a plurality of traffic signal devices of the intersection which have inconsistent classification states during a performance evaluation period of time; and evaluating discrepancies between the classification state between overlapping images from the vehicle and a second vehicle in proximity to the vehicle and the intersection.

The description herein describes a scenario where the overlapping FOV images of the traffic light signal devices of the same intersection are from two different sources, such as a first vehicle and a second vehicle. However, a remote CVS may capture images of the traffic light signal devices. Thus, the two different sources of overlapping FOV images may be images from the remote CVS, such as at a corner of the intersection, and the first vehicle for the generally same instantiation. In other words, the timing of the FOV images from the first source needs to generally correspond to the timing of the FOV images of the second source.

Temporal Consistency Classifier (TCC) Performance Evaluator

The temporal consistency classifying (TCC) performance evaluator 402 determines whether a light state change conforms to or complies with temporal ranges according to jurisdiction standards, such as without limitation, the standards of the United States. In the United States, traffic lights change state at a frequency of no more than 1 Hz. The shortest duration of a traffic light state should last for about 333 milliseconds (the frequency guidelines in the Manual on Uniform Traffic Control Devices (MUTCD) are slightly more complicated than 1 Hz) for flashing lights. For most other traffic light states, a minimum duration of a state will be longer, at least 3-4 seconds. Therefore, any sequence of inferred traffic light states that is shorter than 333 milliseconds (ms) for flashing lights or 3 seconds for solid lights likely results in an error in traffic light classification, in relation to temporal ranges. These errors can be quantified and used as a measure of traffic light classification performance.

Figure 5:
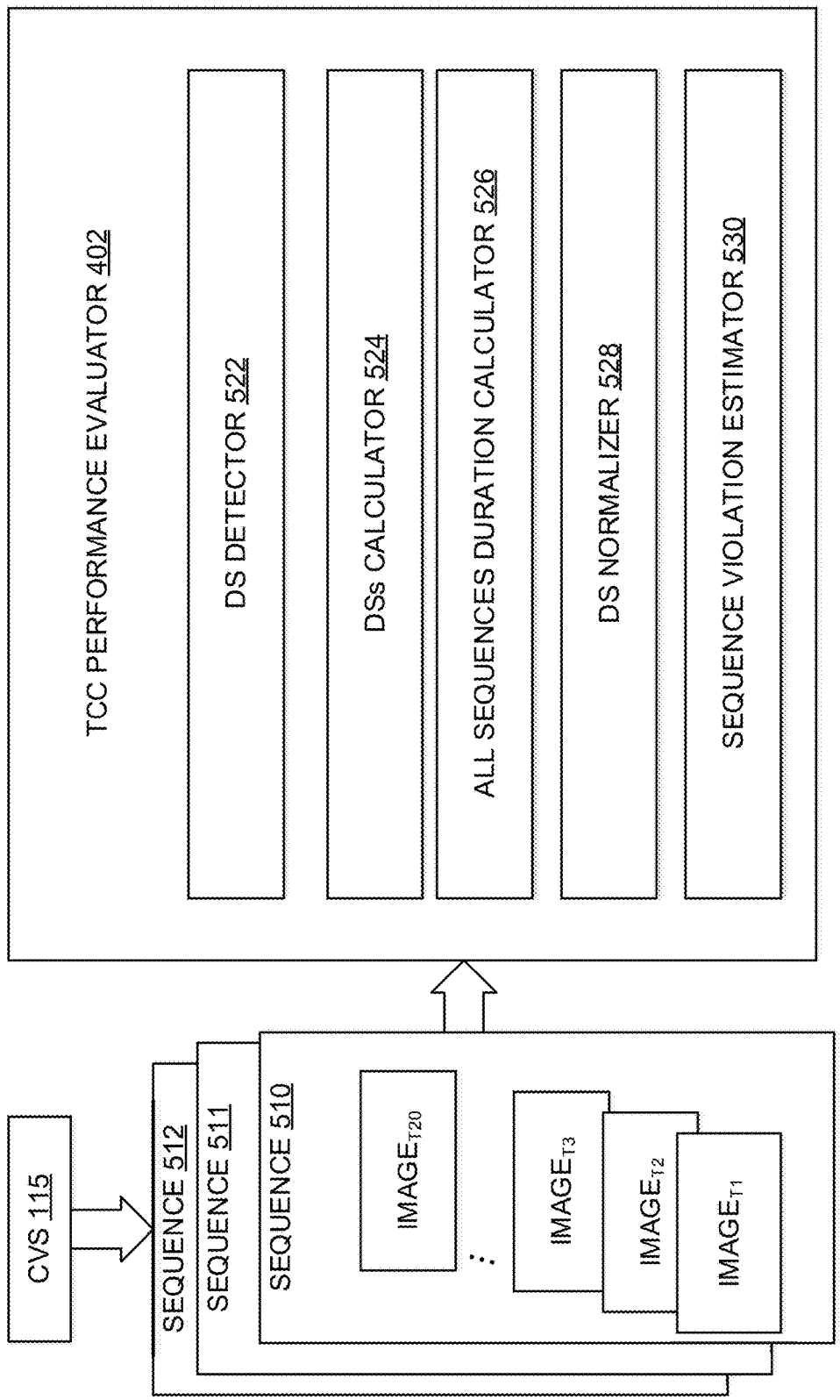
FIG. 5 illustrates an example block diagram of a temporal consistency classifying (TCC) performance evaluator.

Referring to FIG. 5 an example block diagram of a temporal consistency classifying (TCC) performance evaluator 402 is shown. The software, firmware and/or hardware module or sub-modules that includes programming instructions for performing the functions of the TCC performance evaluator 402 may include further sub-modules of software, firmware and/or hardware that includes programming instructions for performing functions described herein of one or more of a disallowed sequence (DS) detector 522, DSs calculator 524, all sequences calculator 526, DS normalizer 528, and sequence violation estimator 530.

The TCC performance evaluator 402 may include a DS detector 522 to detect from a set of sequences 510, 511, and 512 one or more disallowed sequences where a disallowed sequence is a sequence with does not comply with the ordered sequence of states associated with the traffic light type. The order states may include green→yellow→red as an allowed sequence. However, red→yellow→green is not an allowed sequence.

The CVS 115 may be configured to take a video for a duration of time or still images. Instantiations of the video in sequence being separated in time, such as time T1, time T2, time T3 and time T20 or still images of these times creates a set of sequences of images, denoted as $IMAGE_{T1}$, $IMAGE_{T2}$, $IMAGE_{T3}$, ..., $IMAGE_{T20}$ where the subscript of T2, T2, T3, ..., T20 represents a different instantiation of time in sequence. The time duration between time T1 and T2, for example, or any two adjacent time points may be one or more nanoseconds, milliseconds or seconds. The time duration between any two adjacent images may be fixed or variable.

Assumed a light should be a particular color, for example, yellow for 3-4 seconds. The sequence of images $IMAGE_{T1}$, $IMAGE_{T2}$, $IMAGE_{T3}$, ..., $IMAGE_{T20}$, for example, may include a set of images that are classified as a yellow state. However, evaluation of the sequence of images detected a sequential subset of images that were yellow for 2 second or 6 seconds. As a result, the TLC 202 may have miss classified those set of images.

The TCC performance evaluator 402 may determine the number of disallowed sequences and add the total number of detected disallowed sequences together by the DSs calculator 524 to calculate a first duration associated with the total duration of the duration of the detected DSs. The TCC performance evaluator 402 may add all of the sequences under evaluation together by an all sequences calculator 526 to calculate a total number of transition sequences. The TCC performance evaluator 402 may normalize the DSs by a DS normalizer 528. The DS normalizer 428 may normalize the total DSs by the total number of transitions of all sequences. The TCC performance evaluator 402 may include a sequence violation estimator 530 which includes the fraction of sequences that violated typical or standard traffic light behavior. In some embodiments, the normalizer may normalize the DSs as a function of the total number of disallowed transitions divided by the total amount of time that the system was running to detect the disallowed transitions.

Temporal Consistency After Filtering Classifying (TCAFC) Performance Evaluator

Figure 6:
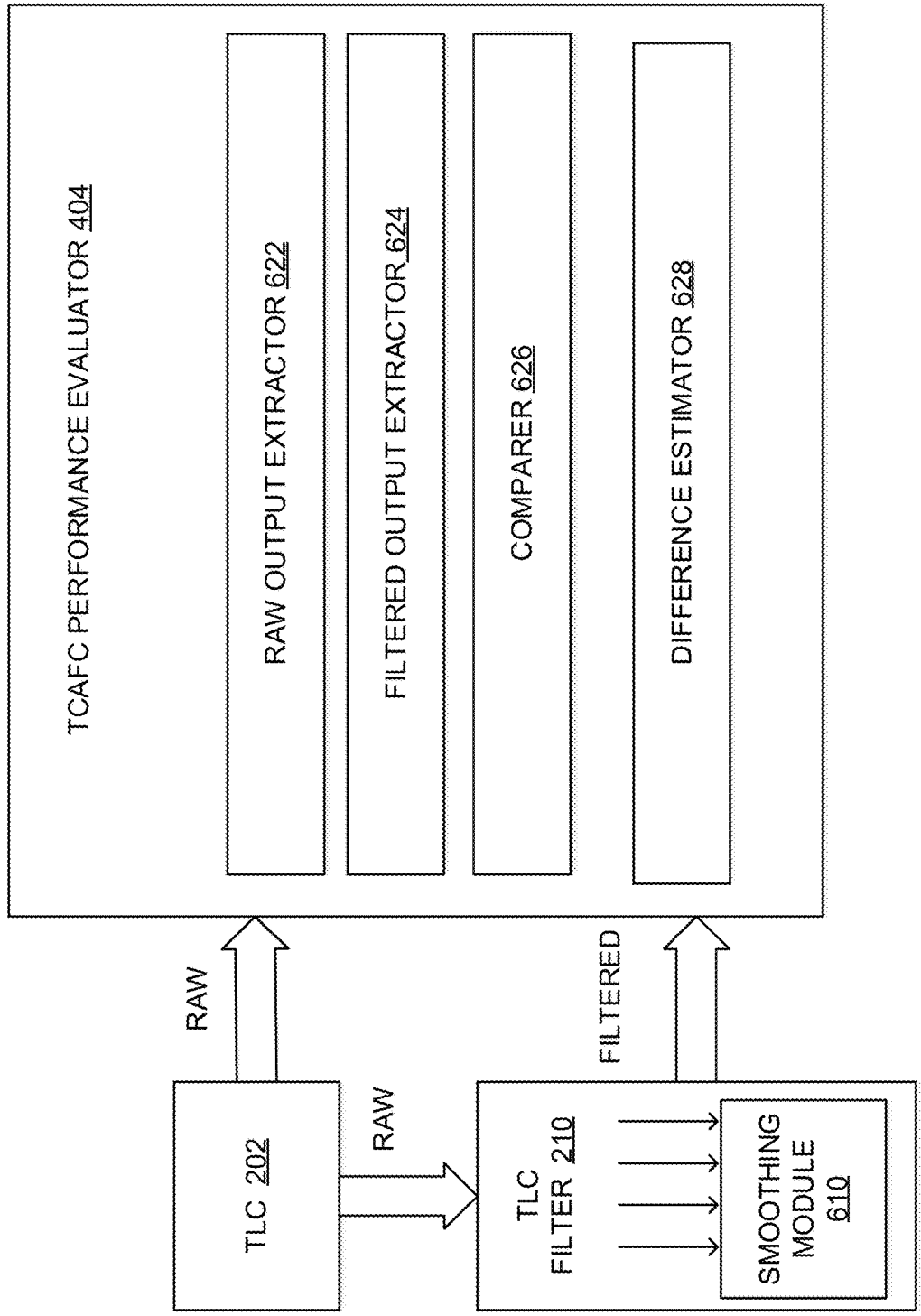
FIG. 6 illustrates an example block diagram of a temporal consistency after filtering classifying (TCAFC) performance evaluator.

Referring now to FIG. 6, an example block diagram of the temporal consistency after filtering classifying (TCAFC) performance evaluator 404 is shown. The software, firmware and/or hardware module or sub-modules that include programming instructions for performing the functions of the TCAFC performance evaluator 404 may include further sub-modules of software, firmware and/or hardware that includes programming instructions for performing functions described herein of one or more of a raw output extractor 622, filtered output extractor 624, comparer 626 and difference estimator 628. The temporal consistency may be distinct from allowed versus disallowed transitions. Temporal consistency can refer to two things. The first has been discussed above, and it relates to the frequency of state transitions (i.e., flickering is not allowed). The second is that a frame-based classifier should agree with the output of the temporal tracker that tracks the states over time.

The TCAFC performance evaluator 404 may be configured to determine a performance of a bulb classifier. The TCAFC performance evaluator 404 may include a raw (non-filtered) output extractor 622 to extract the raw output from the TLC 202. Each raw output includes a classification state generated by the TLC. The TCAFC performance evaluator 404 may be configured to extract filtered outputs from the TLC 202 by a filtered output extractor 624 associated with the raw output. By way of non-limiting example, the filtered outputs may be a temporally smoothed or filtered sequence of the outputs by the TLC filter 210. The TLC filter 210 may include a software, firmware and/or hardware module that includes programming instructions that are configured to instruct a processor to filter out high frequency state fluctuations of raw outputs from the TLC 202. For example, raw confidence values for individual traffic light bulbs can be tracked using a smoothing module 610. The smoothing module 610 may include a hidden Markov model (HMM), by way of non-limiting example. The tracking has the effect of smoothing or filtering out high frequency state fluctuations. In some embodiments, the filtering may be separate from or integrated in the TCAFC performance evaluator 404. For example, one filtered output can integrate information from all previous frame-based outputs.

The TCAFC performance evaluator 404 may include a comparer 626 to compare the sequence of the extracted raw outputs from a TLC 202 with the extracted filtered outputs from the TLC filter 210. The TLC 202 operates on the captured digital images. In other words, the comparison is between the frame-based estimate at time T (i.e., filtered output) and the tracked estimate at time T (i.e., raw output). The filtered output may be representative of a "frame-based state" and the raw output may be a "tracked classification state." The TCAFC performance evaluator 404 may compare the outputs of two algorithms, one that just sees frame-based inputs, and one that sees a sequence of inputs. The difference estimator 628 may be configured to determine a difference between the frame-based inputs and the sequence of inputs to identify whether there are any classification errors between the "frame-based state" and the "tracked classification state."

Figure 7:
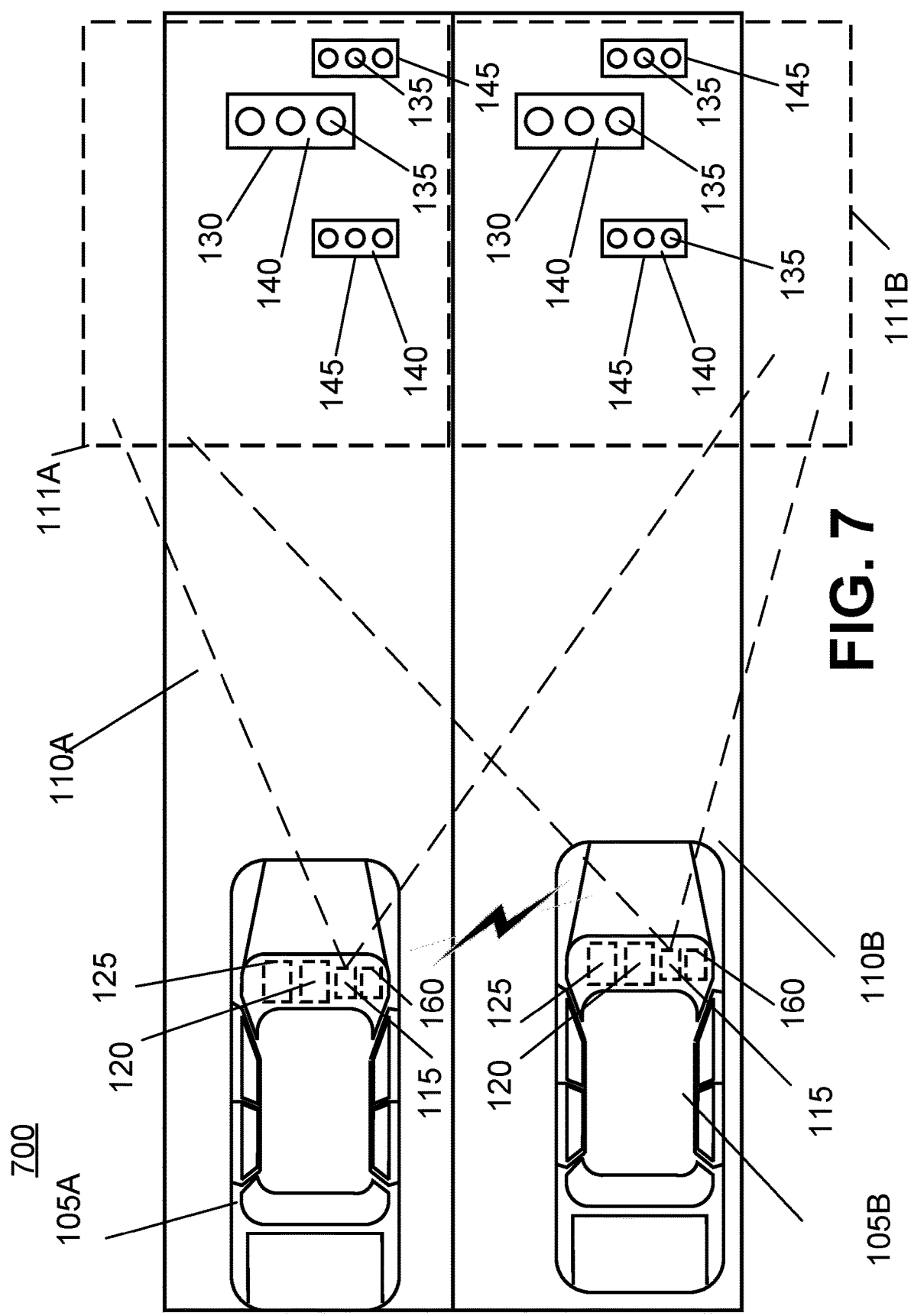
FIG. 7 illustrates an example intersection with multiple lights, multiple lanes and vehicles.

Referring now to FIG. 7, an example intersection with multiple lights, multiple lanes and vehicles is shown. Many intersections are controlled by multiple traffic lights that are redundant and convey the same information. These redundant traffic lights may be recorded before a vehicle 105A or 105B begins operations (most commonly in a map). In these situations, any disagreements in the inferred states of these traffic lights must result from an error in classification. The road 110A on which vehicle 105A travels may include a lane traffic light control 111A which may be separate from the system 700 and part of the environment. The road 110B on which vehicle 105B travels may include a lane traffic light control 111B which may be separate from the system 700 and part of the environment.

The system 700 includes a refined TLC pipeline using performance evaluator for refined traffic light classification, as shown in FIGS. 2-4. The system 700 will be described in more detail in relation to at least FIG. 10.

Same-State Consistency Classifying (SSCC) Performance Evaluator

Figure 8:
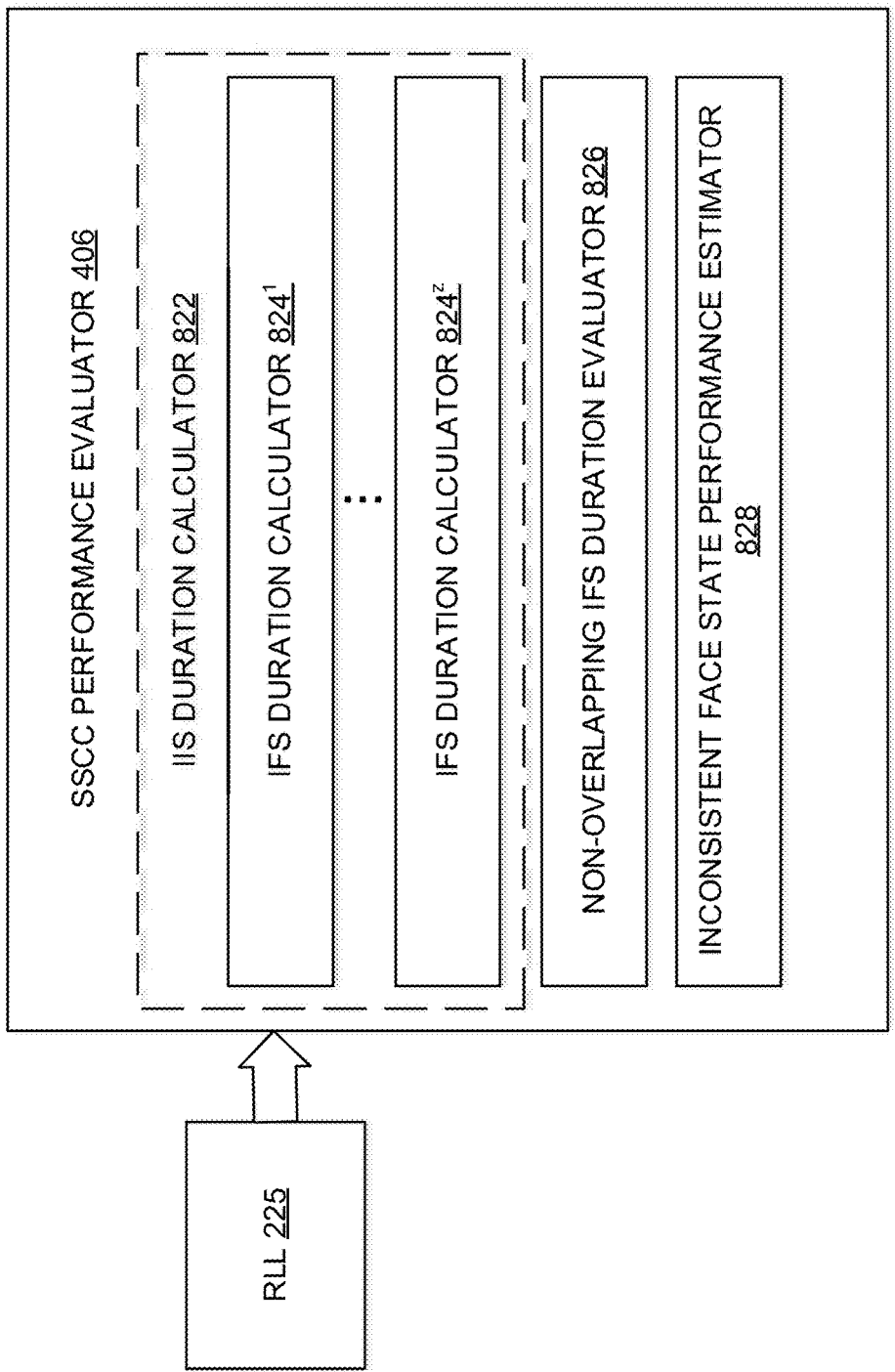
FIG. 8 illustrates an example block diagram of a same-state consistency classifying (SSCC) performance evaluator.

Referring now to FIG. 8, an example block diagram of a same-state consistency classifying (SSCC) performance evaluator 406 is shown. The software, firmware and/or hardware module or sub-modules that include programming instructions for performing the functions of the SSCC performance evaluator 406 may include further sub-modules of software, firmware and/or hardware that includes programming instructions for performing functions described herein of one or more of an intersection inferred state duration calculator 822, a non-overlapping inferred face state duration evaluator 826 and inconsistent face state performance estimator 828. The SSCC performance evaluator 406 may evaluate the performance of consistency between traffic lights that are known to have the same state, such as shown in FIG. 7. The performance evaluator 406 may evaluate multiple faces in the real world that are known to have the same state. The set of faces may be observed by multiple cameras at the same time or observed by multiple cars at the same time.

These redundant traffic lights may be recorded in a RLL 225 before a vehicle 105 begins operations (most commonly in a map). In these situations, any disagreements in the inferred states of these traffic lights must result from an error in classification. The SSCC performance evaluator 406 may include an intersection inferred state (IIS) duration calculator 822 which calculates a duration of time all faces are in a particular one state. Hence, the SSCC performance evaluator 406 may include an IIS duration calculator for each different state of an intersection. For example, a state duration may determine a length of time all traffic light faces display or illuminate the same color or symbol state.

The IIS duration calculator 822 may include a plurality of inferred face state (IFS) duration calculators $824^1 \ldots 824^Z$ where Z is a non-zero integer corresponding to the number of redundant faces at an intersection. Each IFS duration calculators $824^1 \ldots 824^Z$ calculates and marks the beginning and end time of the duration of a corresponding state of the face. The IIS duration calculator 822 may include a non-overlapping IFS duration evaluator 826 which evaluates that fraction of time any one or more of the redundant traffic light faces have non-overlapping inferred face state durations. The non-overlapping IFS durations may be before or after any period of time two or more redundant faces overlap with a redundant state. In general, the SSCC performance evaluator 406 may include an inconsistent face state performance estimator 828 configured to report this error by reporting the fraction of time that redundant faces has inconsistent states assigned to them.

The SSCC performance evaluator 406 may determine a fraction of time redundant faces of the plurality of signal devices of the intersection which have inconsistent classification states during a performance evaluation period of time; and use the fraction of time associated with the redundant faces of an intersection for training the TLC.

Impermissible State Transition Classifying (ISTC) Performance Evaluator

Figure 9:
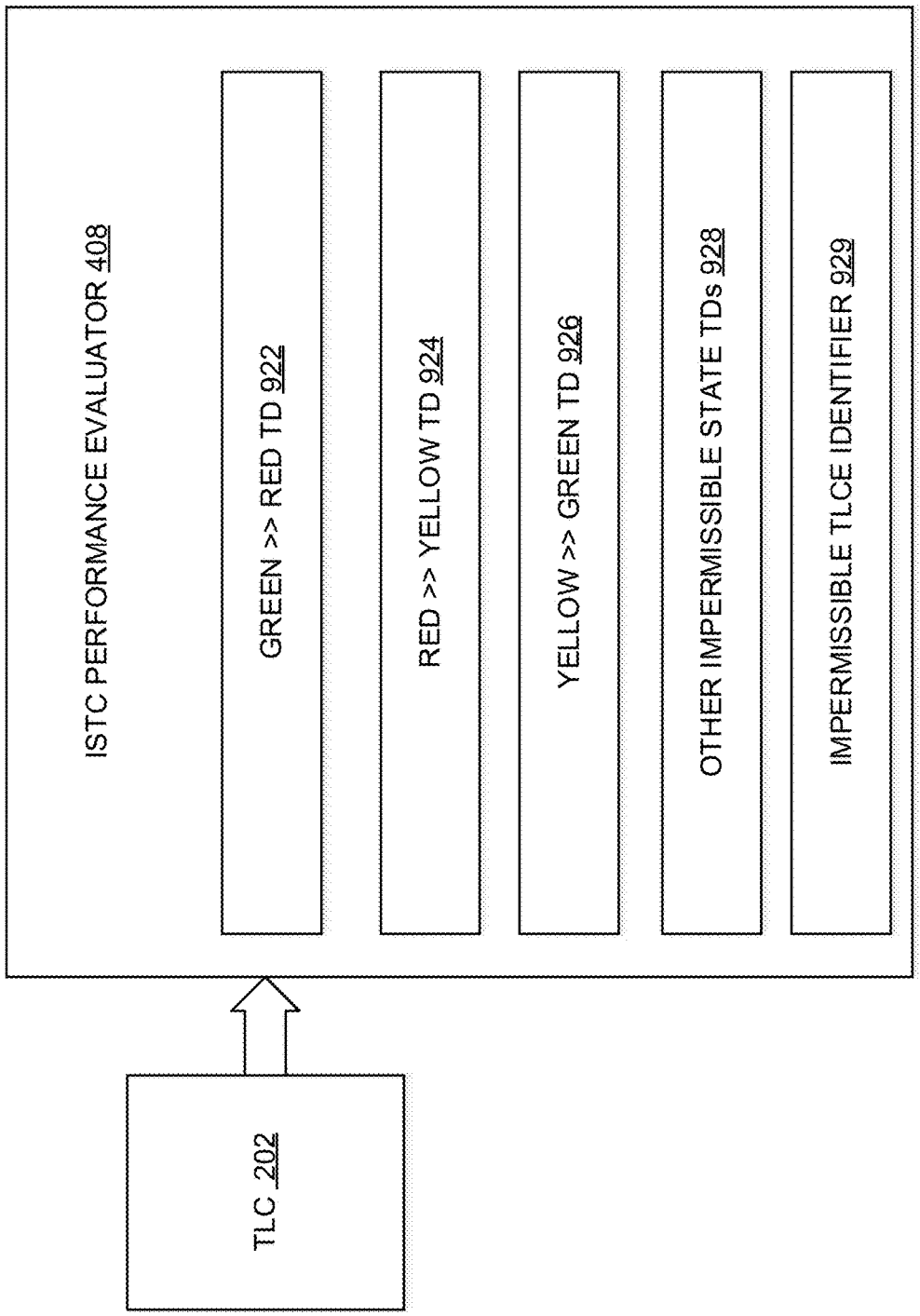
FIG. 9 illustrates an example block diagram of an impermissible state transition classifying (ISTC) performance evaluator.

Referring now to FIG. 9, an example block diagram of an impermissible state transition classifying (ISTC) performance evaluator 408 is shown. ISTC performance evaluator 408 detects impermissible state transitions. The ISTC performance evaluator 408 may determine which state transitions are allowed and which state transitions are disallowed state transitions. By way of non-limiting example, traffic lights are well-defined state machines that have predictable behavior. The simplest traffic light consists of three bulbs including a red bulb, a yellow bulb, and a green bulb. The three-bulb traffic light cycles through the states, for example, in the order of: green to yellow, yellow to red, and red to green and then repeats. During normal traffic light operations, the state transitions corresponding to green to red, red to yellow, and yellow to green transitions are never observed and impermissible. The software, firmware and/or hardware module or sub-modules that include programming instructions for performing the functions of the ISTC performance evaluator 408 may include further sub-modules of software, firmware and/or hardware that includes programming instructions for performing functions described herein of one or more of a green to red transition detector 922, red to yellow transition detector 924, yellow to green transition detector 926, other impermissible state transition detectors 928 and impermissible traffic light classification error identifier 929.

The ISTC performance evaluator 408 may include a green to red transition detector (TD) 922 to detect miss identified (classified) state transitions from a green state to a red state where "TD" represented transition detector. The ISTC performance evaluator 408 may include a red to yellow TD 924 to detect miss identified (classified) state transitions from a red state to a yellow state. The ISTC performance evaluator 408 may include a yellow to green TD 926 to detect miss identified (classified) state transitions from a yellow state to a green state. The ISTC performance evaluator 408 may include other impermissible state TDs 928 to detect other types of impermissible state transitions such as for traffic light faces with other bulb configurations, such as configurations that include arrows. Detections of these impermissible state transitions could indicate that the traffic light pipeline has made a classification error. Hence, the ISTC performance evaluator 408 may include an impermissible traffic light classification error (TLCE) identifier 929 related to traffic light classification errors associated with identified impermissible state transitions. In operation, the final classification state may be evaluated where images are not required for performance evaluations by the ISTC performance evaluator 408.

Overlapping FOV Consistency Classifying (OFOVCC) Performance Evaluator

Figure 10:
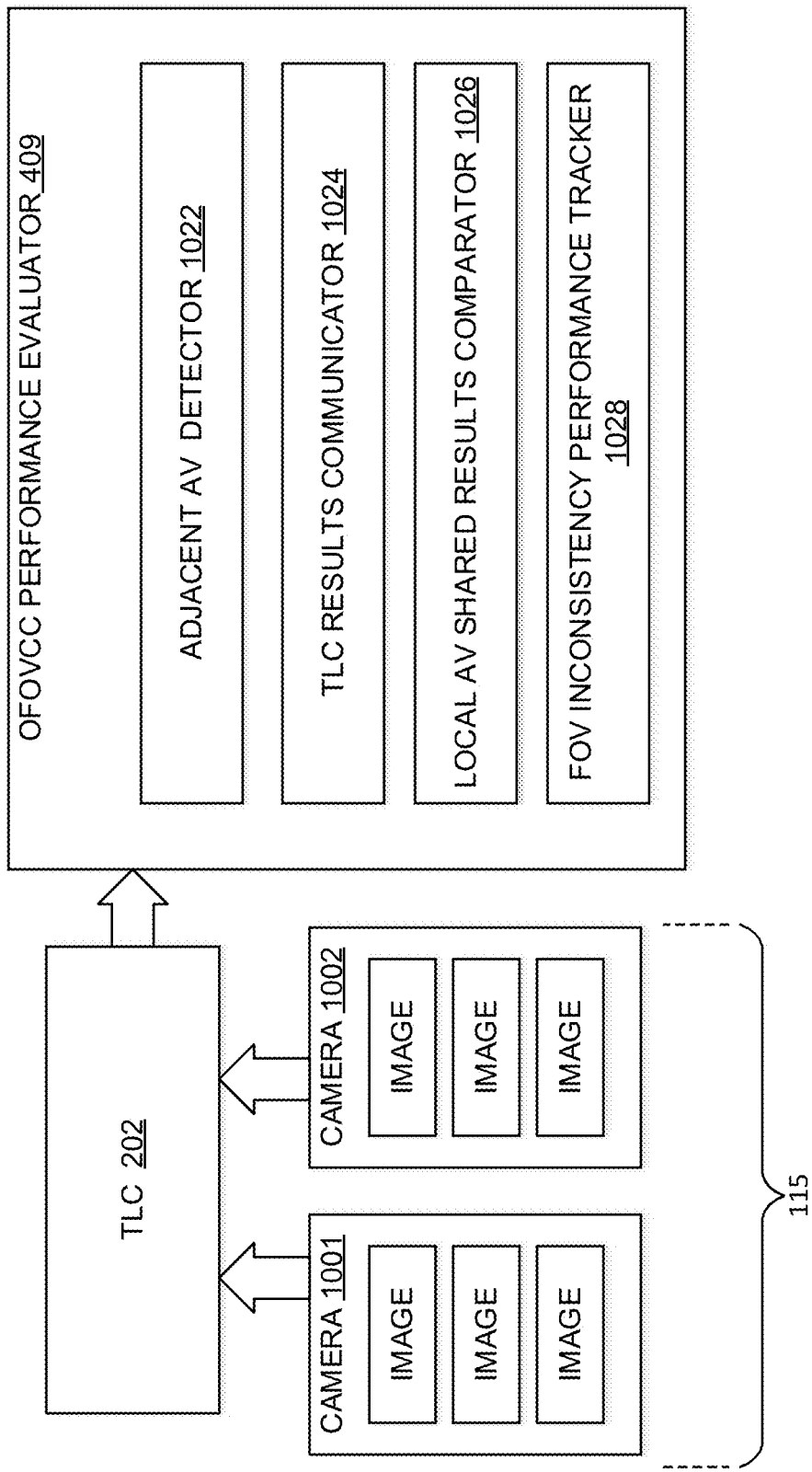
FIG. 10 illustrates an example block diagram of an overlapping FOV consistency classifying (OFOVCC) performance evaluator.

Referring now to FIG. 10, an example block diagram of an overlapping FOV consistency classifying (OFOVCC) performance evaluator 409 is shown. The OFOVCC performance evaluator 409 may determine the consistency between cameras viewing the same traffic light. In some instances, a vehicle 105 may include multiple cameras, as shown in FIG. 1, which have overlapping fields of view (FOV). The multiple FOVs are not shown in FIG. 1. In other instance, multiple vehicles may have an overlapping field of view which is in conflict with a vehicle having an overlapping field of view at the same instance in time. The software, firmware and/or hardware module or sub-modules that include programming instructions for performing the functions of the OFOVCC performance evaluator 409 may include further sub-modules of software, firmware and/or hardware that includes programming instructions for performing functions described herein of one or more of an adjacent AV detector 1022, TLC results communicator 1024, local AV shared results comparator 1026, and FOV inconsistency performance tracker 1028.

Thus, overlapping images of the same face should be assigned the same state. Therefore, a TLC should assign the same state to the same face, even if poses of the cameras producing those images are slightly different. Instances where images from multiple cameras, such as cameras 1001 and 1002 of the CVS 115, viewing the same face result in different traffic light state classifications indicates a problem with the traffic light classifier. This approach can also be generalized to multiple different vehicles that are viewing the same traffic lights at the same time.

Referring also to FIG. 7, in an example, vehicle 105A could classify the state of traffic light via the TLC 202 and then publish that state of a traffic light face according to the FOV of vehicle 105A. The OFOVCC performance evaluator 409 may include an autonomous vehicle (AV) detector 1022 configured to detect a vehicle (e.g., vehicle 105B) at the intersection that may have overlapping FOV image(s). By way of non-limiting example, vehicle 105A may use an ad hoc communications protocol, Long Term Evolution (LTE) communication standards, BLUETOOTH, or near field communication (NFC), by way of non-limiting example, to send the results of their TLC classification corresponding to the state of the traffic light face.

Vehicle 105B may then receive the state assigned by vehicle 105A via a TLC results communicator 1024 and compare the received classification results from vehicle 105A to its own classified state from its TLC pipeline 201 in a local AV shared results comparator 1026. The local AV shared results comparator 1026 may be associated with a specific vehicle receiving a result. Likewise, vehicle 105A would receive the classified state assigned by vehicle 105B and compare it to its own classified state from its TLC pipeline 201 in the local AV shared results comparator 1026 for vehicle 105A. The OFOVCC performance evaluator 409 may include a FOV inconsistency performance tracker 1028 which trackers the number of inconsistencies detected between vehicles (e.g., vehicles 105A and 105B) at any instance in time. The images with overlapping FOVs at the same instance in time allows the images to be captured with essentially the same ambient conditions, including lighting and weather conditions for refined classifier training.

Accordingly, first a vehicle would receive a communication for the second vehicle, the communication including information associated with a classification state classified by a TLC of the second vehicle. Then the results of the classification state classified by the TLC of the first vehicle and the received classification state classified by the TLC of the second vehicle to determine errors in the classification state associated with one of the first vehicle and the second vehicle can be compared by comparator 1026.

The example of FIG. 7 illustrates two vehicles side by side or generally parallel. However, the two vehicles could be serially aligned, one behind the other in the same lane. In other instances, the two vehicles could be separated by one or more cars in parallel with the vehicles 105A and 105B. In other instances, the two vehicles could be separated by one or more cars in series and between the vehicles 105A and 105B.

Quantization Loss (QL) Performance Evaluator

Figure 11:
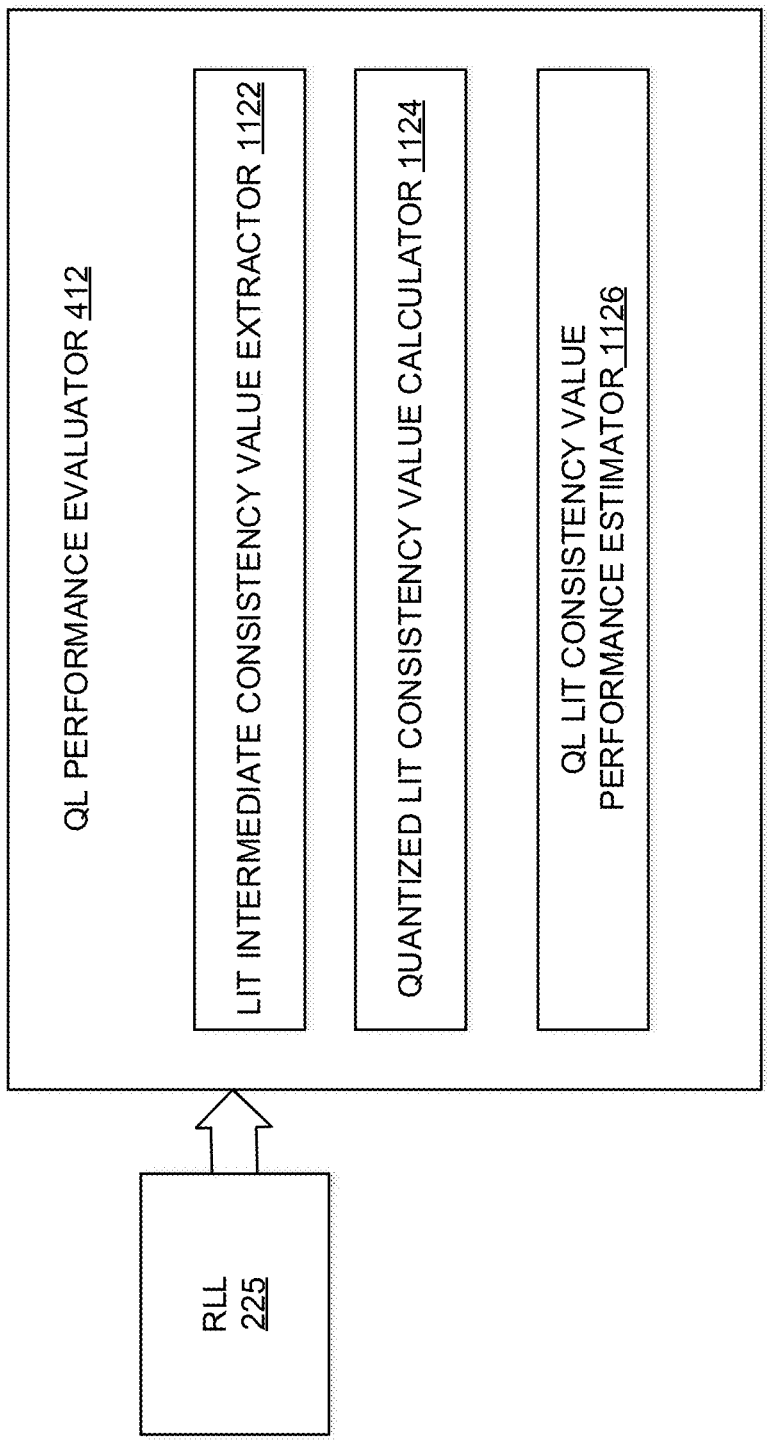
FIG. 11 illustrates an example a block diagram of a quantization loss (QL) performance evaluator.

Referring now to FIG. 11, an example block diagram of a quantization loss (QL) performance evaluator 412 is shown. When operating optimally, the TLC 202 should assign a state of ON (confidence 1) to traffic light bulbs that are lit, and a state of OFF (confidence 0) to traffic light bulbs that are not lit. In general, the confidence value is a float value that can vary between 0 and 1. The confidence value is output by the TLC 202 with the classified state. The software, firmware and/or hardware module or sub-modules that include programming instructions for performing the functions of the QL performance evaluator 412 may include further sub-modules of software, firmware and/or hardware that includes programming instructions for performing functions described herein of one or more of an intermediate lit consistency value extractor 1122, a quantized lit consistency value calculator 1124, and a QL lit consistency value performance estimator 1126.

The QL performance evaluator 412 may include an intermediate lit consistency value extractor 1122 to extract the intermediate lit consistency value from the TLC 202. The QL performance evaluator 412 may include a quantized lit consistency value calculator 1124. For images that are close to the decision boundary between ON and OFF, the TLC 202 may output an intermediate confidence value, for example 0.6. In these cases, it is possible to quantify, via the quantized lit consistency value calculator 1124, the difference between the intermediate confidence value (0.6) and the quantized confidence value (1): in this case the difference is 0.4. The QL performance evaluator 412 may include a QL lit consistency value performance estimator 1126 to detect large differences between the quantized confidences and the assigned confidences and indicate potential errors with the TLC 202. By way of non-limiting example, a value of 0.4-0.5 may be large because it essentially means that the classifier did not know the answer and may have made a decision on a 50/50 tossup or using another randomization function.

Implausible Multi-Light States Error Detector (IMLSED) Performance Evaluator

Figure 12:
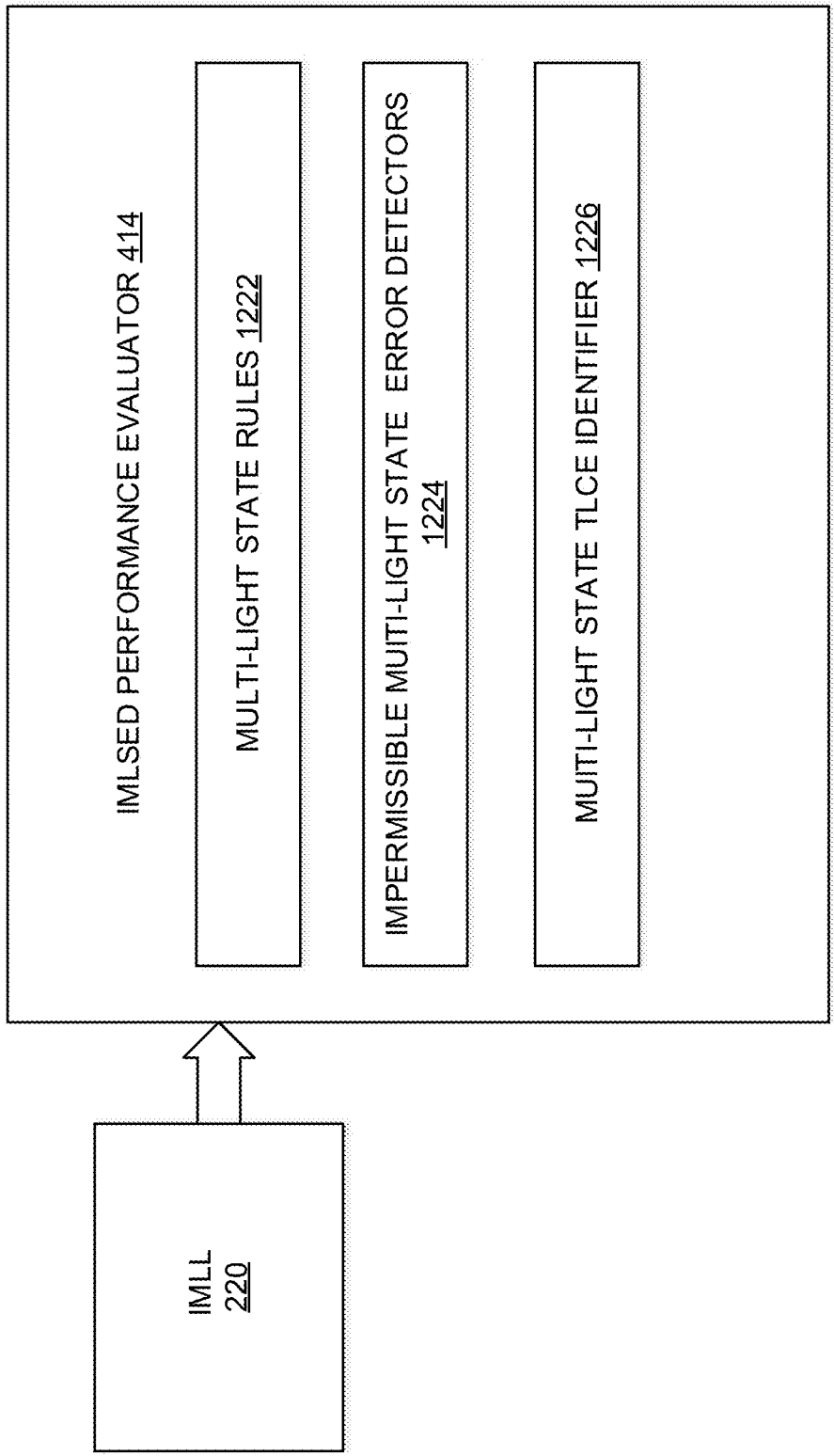
FIG. 12 illustrates an example block diagram of an implausible multi-light states error detector (IMLSED) performance evaluator.

Referring now to FIG. 12, an example block diagram of an implausible multi-light states error detector (IMLSED) performance evaluator 414 is shown. The IMLSED performance evaluator 414 may detect errors associated with implausible traffic light states associated with state classification of multiple lights simultaneously. Traffic lights in the United States usually obey the rule that there are never two traffic light bulbs of the same type but with different colors that are lit (illuminated) at the same time. The software, firmware and/or hardware module or sub-modules that include programming instructions for performing the functions of the IMLSED performance evaluator 414 may include further sub-modules of software, firmware and/or hardware that includes programming instructions for performing functions described herein of one or more of [a]the following: multi-light state rules 1222, an impermissible multi-light state error detector 1224, and a multi-light state traffic light classification error identifier 1226.

The IMLSED performance evaluator 414 may include multi-light state rules 1222. For example, a traffic light indicating whether a turn is permitted would usually not have a green arrow and a yellow bulb illuminated at the same time. While there are exceptions to these rules, the exceptions can be identified in a variety of ways, for example mapping efforts or data analytics.

An IMLL 220 may be used to provide information for use by the IMLSED performance evaluator 414 in lieu of labeled data. The IMLSED performance evaluator 414 may include an impermissible multi-light state error detector 1224 to detect instances of classification error by the TLC 202 related to multi-light state classifications associated with a single traffic light device. For most traffic lights, these implausible combinations of lit bulbs stored in the IMLL 220 can be used to detect that a TLC 202 has made an error associated with implausible combinations of lit bulbs associated with a particular image set at an instance of time. The IMLSED performance evaluator 414 may include a multi-light state traffic light classification error (TLCE) identifier 1226 configured to identify the multi-light state classification error.

In general, the IMLSED performance evaluator 414 may detect that the classified classification state is a multi-light classification state; and determine multi-light state rules and locations of multi-light traffic signal devices. Then the IMLSED performance evaluator 414 may detect a classification error of implausible multi-light states by the TLC based on the determined multi-light state rules and the locations of multi-light traffic signal devices.

Vehicle Log (VL) Performance Evaluator

Figure 13:
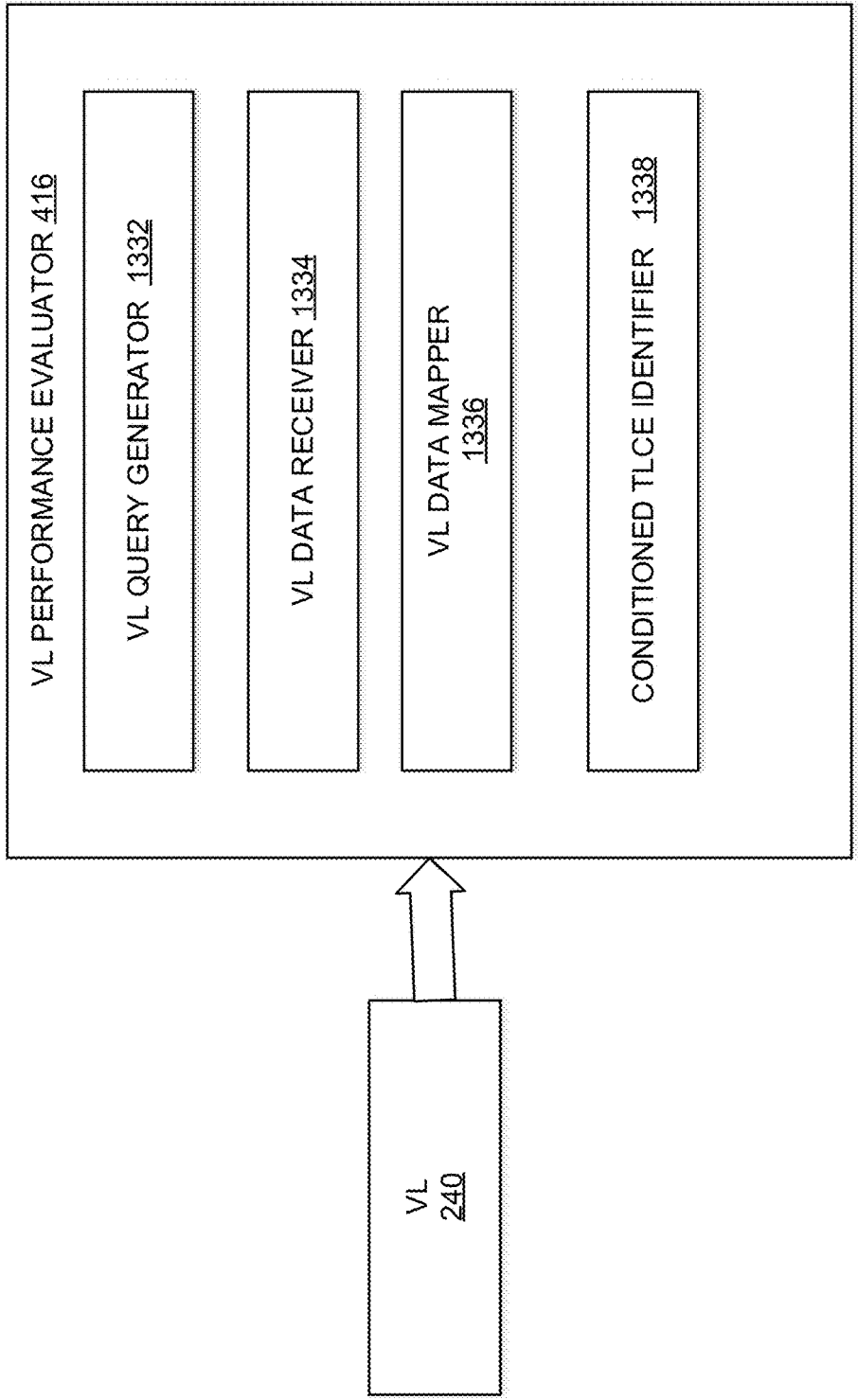
FIG. 13 illustrates an example a block diagram of a vehicle log (VL) performance evaluator.

Referring now to FIG. 13, an example block diagram of a vehicle log (VL) performance evaluator 416 is shown. Generally, impossible or unlikely situations given map or other information can be determined by the VL performance evaluator 416. Over time a wealth of information is accumulated about traffic signals which is recorded in vehicles logs 240 associated with vehicle 105. The software, firmware and/or hardware module or sub-modules that include programming instructions for performing the functions of the VL performance evaluator 416 may include further sub-modules of software, firmware and/or hardware that includes programming instructions for performing functions described herein of one or more of a VL query generator 1332, VL data receiver 1334, VL data mapper 1336, and conditioned TLCE identifier 1338.

The VL performance evaluator 416 may include a vehicle log query generator 1332 and a VL data receiver 1334 to receive the VL data based on the query, in some examples. The query generator 1332 may query the vehicle log autonomously for information associated with classification assignment based on a particular condition. The condition may provide a weighted condition, in the classification process. In other example, a query may be for one, more or all searchable conditions.

By way of non-limiting example, a condition may be a time of day, weather condition, ambient environmental condition, traffic light exception, or other condition. For example, VL 240 may be queried for log entries associated with a condition such as one or more of morning hours, midday hours, afternoon hours, and night hours. The condition may query the VL 240 for flashing traffic light types. Other conditions may include a geographic region.

The VL performance evaluator 416 may receive VL data from a plurality of VLs from the same vehicle or different vehicles. By way of non-limiting example, the VL performance evaluator 416 may include a VL data mapper 1336 mapping and data analytics of recorded vehicle logs may be used to evaluate errors. By way of non-limiting example, a condition may evaluate TLC pipeline classified outputs within a particular low probability range. For example, a model may be built to predict typical traffic light outputs based on various conditions. Then such a model may be used to find cases where the probability of what actually happened is low as a way to find exceptions to typical cases. The choice of the probability threshold here may be arbitrary.

The VL performance evaluator 416 may include a conditioned TLCE identifier 1338. For example, VL 240 may record whether a particular traffic light bulb is allowed to flash, and the conditioned TLCE identifier 1338 may use that information from the VL 240 to evaluate the performance of a traffic light classifier 202 operating on the traffic light that contains that bulb with flashing capability. Any information that can be used to enforce rules on the allowed state of a traffic light or consistency information for traffic lights can be used to evaluate the quality of traffic light classifications based on certain conditions. For example, typically a yellow state of a traffic light may be 3-4 seconds. However, flashing yellow lights flicker from on to off consistently or for an unknown duration, such as the case of a traffic light malfunction. This information may or may not be encoded in the map. The VL data mapper 1336 may be configured to provide an update information to the TLC 240, as needed.

In another example, the VL performance evaluator 416 may use data analytics to determine the probabilities of traffic light classifier pipeline outputs which are conditioned on information like the particular traffic light or the time of day. Pipeline outputs with a particularly low probability could be the result of errors and could be used to determine the quality of the overall traffic light classifier pipeline 201. By way of non-limiting example, based on a time of day condition, the probability, confidence value or other metric associated with a classification state can be analyzed for patterns. For example, a lower confidence value may be consistently generated for the same time of day any time, for a traffic light classification state of a red state. On the other hand, a lower confidence value may be consistently generated for the same light, regardless of time of day, for a traffic light classification state of a green state. In some instances, these particular instances may be evaluated for classification performance errors.

Classifier Performance Fusion Module

The performance evaluator 250 may include a classifier performance fusion module 460. The results from a selected set of the TCC performance evaluator 402, TCAFC performance evaluator 404, SSCC performance evaluator 406, the ISTC performance evaluator 408, the OFOVCC performance evaluator 409, the QL performance evaluator 412, IMLSED performance evaluator 414 and the VL performance evaluator 416 may be combined into a single performance evaluation metric that defines the rate of errors in the TLC pipeline 201, or they may be reported as separate numbers that indicate different types of errors. This information, such as a PEM may be used by the TLC trainer 204 in the TLC pipeline 201 to refine the training of the TLC 202 for improved classification decisions. In one example, the fusion of the selected set of metrics may be a weighted sum of one or more of the different selected metrics that describes an overall aggregate performance of the selected set of metrics.

Image Re-Labeler

Figure 14:
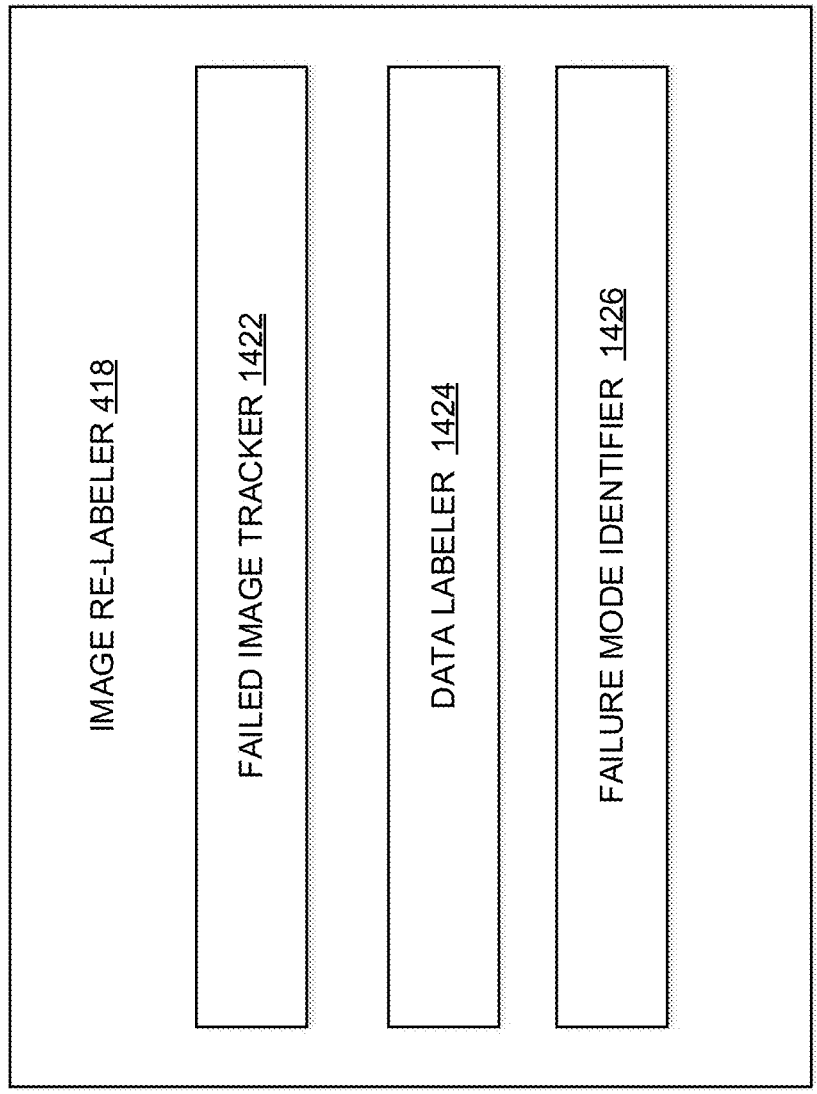
FIG. 14 illustrates an example block diagram of an image re-labeler.

Referring now to FIG. 14, an example block diagram of an image re-labeler 418 is shown. In addition to judging the performance of a traffic light classifier pipeline 201, the metrics/rules from the performance evaluator 250 enumerated above may be used to identify the optimal images to label for further improvements to the traffic light classifier trainer 204. The software, firmware and/or hardware module or sub-modules that include programming instructions for performing the functions of the image re-labeler 418 may include further sub-modules of software, firmware and/or hardware that includes programming instructions for performing functions described herein of one or more of a failed image tracker 1422, data labeler 1424, and failure mode identifier 1426.

The most useful images to label when improving algorithms are the images on which the algorithm fails. The performance evaluator 250 may identify a missed classification as a result of the performance evaluation for each metric identified above, and the corresponding image may be marked as a failed image. This marked failed image may be tracked in a failed image tracker 1422 and added to the database of the labeled images 230 (FIG. 3).

Finding such images for neural networks, by example, with poor performance is relatively easy, but once the performance of a neural network surpasses a certain level where errors are rarer, finding these images becomes difficult. The lesser traffic light errors mentioned above provide a way to identify graceful failure modes, via a failure mode identifier 1426, of a neural network that may not necessarily affect the behavior of the vehicle and provide a more scalable way to select data for labeling, by a data labeler 1424, and training. An example of a failure mode, may be based on those errors identified for the one or more of the performance evaluation metrics described above.

The image re-labeler 418 may track those digital images determined to have failed classification using the algorithm of the TLC, in response to evaluating the performance of the classification generated by the TLC; and generates label data for the digital images with the failed classification for use in classifying by the TLC.

Accordingly, the performance evaluator 250 does not require labeled data and the performance evaluations can be computed at scale on an entire fleet of autonomous vehicles, and can be computed in real time or near real time to indicate a problem that the vehicle is currently having with the classification results of the TLC pipeline 201. The computational processing may be done offline through standard training procedures for supervised learning. For retraining, the images corresponding to the failures would need to be labeled and then used to retrain the model. This process may take several days.

FIG. 15 illustrates an example system architecture 1500 for a vehicle 105, such as an AV. The vehicle 105 may include an engine or motor 1502 and various sensors for measuring various parameters of the vehicle and/or its environment. Operational parameter sensors that are common to both types of vehicles include, for example: a position sensor 1536 such as an accelerometer, gyroscope and/or inertial measurement unit; a speed sensor 1538; and an odometer sensor 1540. The vehicle 105 also may have a clock 1542 that the system uses to determine vehicle time during operation. The clock 1542 may be encoded into the vehicle on-board computing device, it may be a separate device, or multiple clocks may be available.

The vehicle 105 also may include various sensors that operate to gather information about the environment in which the vehicle is traveling. These sensors may include, for example: a location sensor 1560 such as a global positioning system (GPS) device; object detection sensors such as one or more cameras 1562; a LiDAR sensor system 1564; and/or a radar and or and/or a sonar system 1566. The sensors also may include environmental sensors 1568 such as a precipitation sensor and/or ambient temperature sensor. The object detection sensors may enable the vehicle 105 to detect objects that are within a given distance range of the vehicle 105 in any direction, while the environmental sensors collect data about environmental conditions within the vehicle's area of travel. The system will also include one or more cameras 1562 for capturing images of the environment.

During operations, information is communicated from the sensors to an on-board computing device 1520. The on-board computing device 1520 analyzes the data captured by the sensors and optionally controls operations of the vehicle based on results of the analysis and the traffic light classifier. For example, the on-board computing device 1520 may control braking via a brake controller 1522; direction via a steering controller 1524; speed and acceleration via a throttle controller 1526 (in a gas-powered vehicle) or a motor speed controller 1528 (such as a current level controller in an electric vehicle); a differential gear controller 1530 (in vehicles with transmissions); and/or other controllers such as an auxiliary device controller 1554.

Geographic location information may be communicated from the location sensor 1560 to the on-board computing device 1520, which may then access a map of the environment that corresponds to the location information to determine known fixed features of the environment such as streets, buildings, stop signs and/or stop/go signals. Captured images from the cameras 1562 and/or object detection information captured from sensors such as a LiDAR system 1564 is communicated from those sensors) to the on-board computing device 1520. The object detection information and/or captured images may be processed by the on-board computing device 1520 to detect objects in proximity to the vehicle 105. In addition or alternatively, the AV may transmit any of the data to an external server for processing. Any known or to be known technique for making an object detection based on sensor data and/or captured images can be used in the embodiments disclosed in this document. The cameras 1562 may be the same as cameras 1001 and 1002 which are part of the CVS 115 or different cameras.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 16:
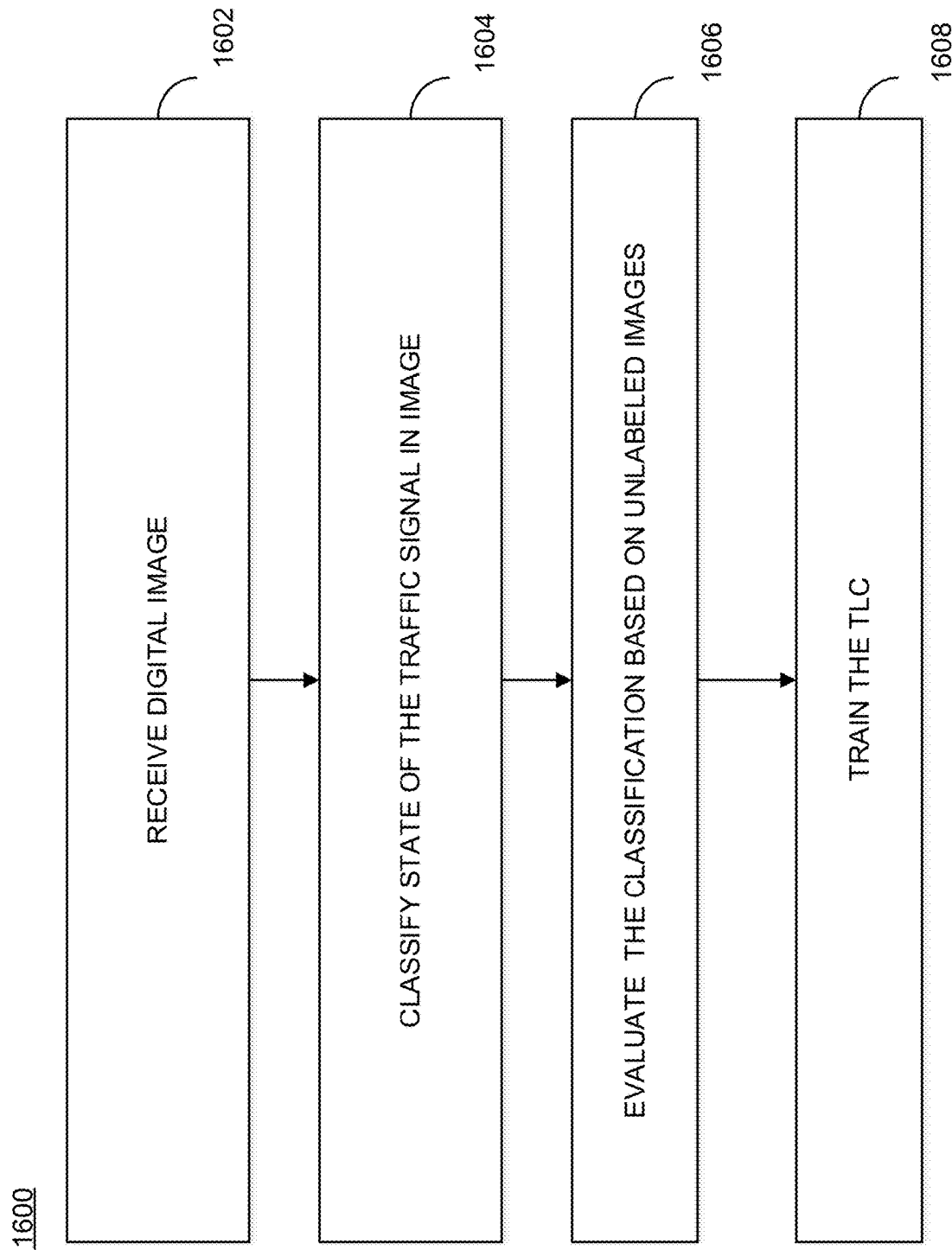
FIG. 16 illustrates an example flowchart of a method for label-free performance evaluation of a traffic light classifier's performance for refined traffic light classifications.

Referring now to FIG. 16, a method 1600 of classifying a traffic light signal state of an intersection is shown. The method steps may be performed in the order shown or a different order. One or more of the method steps may be performed contemporaneously. The method steps may be omitted or added.

The method 1600 may include, by a computer vision system 115 of a vehicle 105, receiving at least one digital image of a traffic signal device, of an imminent intersection, comprising a traffic signal face including one or more traffic signal elements, at block 1602.

The method 1600 may include, by one or more processors 125, classifying, by a TLC, a classification state of the traffic signal face using labeled images correlated to the received at least one digital image, where the classification state to control an operation of the vehicle at the intersection, at block 1604. The method 1600 may include, by one or more processors 125, evaluating a performance of the classification generated by the TLC, the evaluation being a performance evaluation based on unlabeled images, at block 1606. The method 1600 may include, by one or more processors 125, training the TLC based on the evaluated performance, at block 1608.

In one or more examples, one or more blocks of the described methods or techniques may be implemented in hardware, software, firmware, or any combination thereof. If implemented in software, the functions may be stored as one or more instructions or code on a computer-readable medium and executed by a hardware-based processing unit. Computer-readable media corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 17:
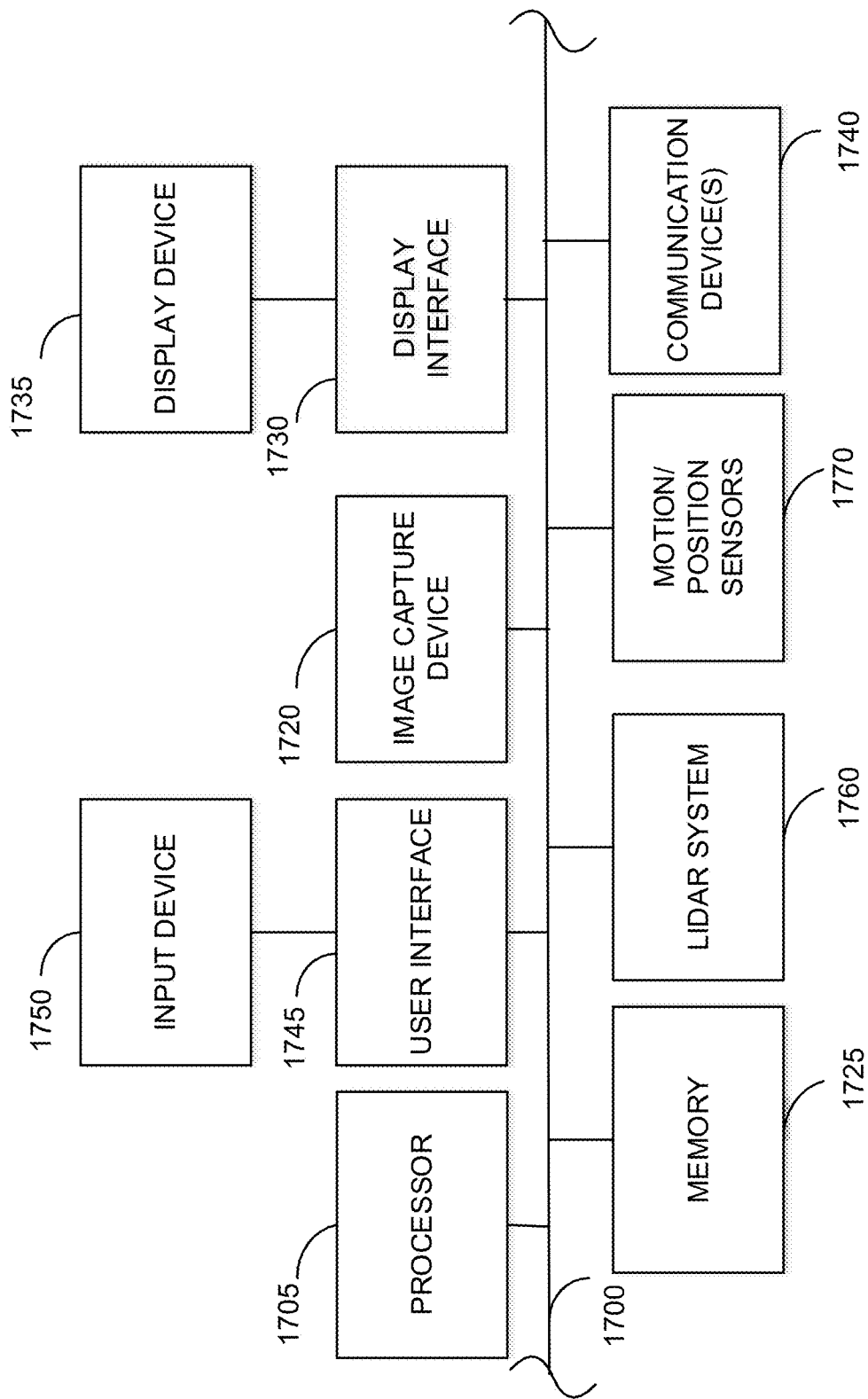
FIG. 17 is a block diagram that illustrates various elements of a possible electronic subsystem of an AV and/or external electronic device.

FIG. 17 depicts an example of internal hardware that may be included in any of the electronic components of the system, such as internal processing systems of the AV, external monitoring and reporting systems, computing devices, controllers, or remote servers. An electrical bus 1700 serves as an information highway interconnecting the other illustrated components of the hardware. Processor 1705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1725. A memory device 1725 may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1730 may permit information from the bus 1700 to be displayed on a display device 1735 in visual, graphic or alphanumeric format, such on an in-dashboard display system of the vehicle. An audio interface and audio output (such as a speaker) also may be provided. Communication with external devices may occur using various communication devices 1740 such as a wireless antenna, a radio frequency identification (RFID) tag and/or short-range or near-field communication transceiver, each of which may optionally communicatively connect with other components of the device via one or more communication systems. The communication device(s) 1740 may be configured to be communicatively connected to a communications network, such as the Internet, a local area network or a cellular telephone data network.

The hardware may also include a user interface sensor 1745 that allows for receipt of data from input devices 1750 such as a keyboard or keypad, a joystick, a touchscreen, a touch pad, a remote control, a pointing device and/or microphone. Digital image frames also may be received from a camera or image capture device 1720 that can capture video and/or still images. The system also may receive data from a motion and/or position sensor 1770 such as an accelerometer, gyroscope or inertial measurement unit. The system also may receive data from a LiDAR system 1760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of evaluating a classifier used to determine a traffic light signal state in digital images, the method comprising:

by a computer vision system of a vehicle, receiving at least one digital image of a traffic signal device of an intersection, wherein the traffic signal device comprises a traffic signal face including one or more traffic signal elements; and by a processor:

implementing a traffic light classifier (TLC) for the vehicle to determine a classification state of the traffic signal face based on the received at least one digital image, evaluating a performance of the determining of the classification state by the TLC by applying one or more performance evaluator metrics to the classification state and without using labeled data from the at least one digital image, identifying, in the evaluating, that the classification state determined by the TLC is a classification error, generating label data for the at least one digital image based on the identified classification error;

relabeling the at least one digital image based on the generated label data, and using the relabeled digital image to refine training of the TLC.

2. The method of claim 1, wherein:
the intersection comprises a plurality of traffic signal devices; and
the evaluating comprises, by the processor:
- detecting, in a sequence of a plurality of digital images of the traffic signal device, disallowed sequences of the plurality of digital images having temporally inconsistent traffic light transitions for a performance evaluation period of time,
- calculating a number of the disallowed sequences of the temporally inconsistent traffic light transitions,
- calculating a total number of transition sequences of the plurality of digital images;
- normalizing the disallowed sequences relative to the total number of transition sequences; and
- using the normalized disallowed sequences to train the TLC.

3. The method of claim 1, wherein:
the at least one digital image comprises at least one digital image from each camera of a plurality of cameras on-board the vehicle;
two or more cameras of the plurality of cameras have fields of view which overlap; and
identifying that the classification state determined by the TLC is a classification error comprises, by the processor, identifying that the classification states assigned to the digital images from the two or more cameras having the overlapping fields of view are different.

4. The method of claim 1, wherein:
the vehicle is a first vehicle;
the evaluating comprises, by the processor:
- detecting a second vehicle in proximity to the first vehicle, the second vehicle having an overlapping field of view (FOV) of the traffic signal device of the imminent intersection,
- receiving a communication from the second vehicle, the communication including information associated with a classification state classified by a TLC of the second vehicle, and
- comparing the classification state classified by the TLC of the first vehicle and the classification state classified by the TLC of the second vehicle to identify that the classification state determined by the TLC of the first vehicle is a classification error.

5. The method of claim 1, wherein:
the evaluating comprises, by the processor:
- receiving a sequence of raw outputs of the TLC, the raw outputs are based on a set of digital images, each raw output corresponds to a respective one classification state,
- filtering the raw outputs of the TLC to effectuate smoothing out of high frequency state fluctuations in the raw outputs to create a filtered output representative of a frame-based state,
- comparing the classification state with the frame-based state, and
- in response to the comparing, identifying that at least one classification state of the sequence from the TLC is a classification error.

6. The method of claim 1, wherein:
the intersection comprise a plurality of traffic signal devices with redundant faces;
the evaluating comprises, by the processor:
- determining a fraction of time the redundant faces have inconsistent classification states during a performance evaluation period of time; and
- using the determined fraction of time associated with the redundant faces of the intersection to train the TLC.

7. The method of claim 1, wherein:
identifying that the classification state determined by the TLC is a classification error comprises determining whether that the classification state by the TLC was an impermissible state transition.

8. The method of claim 7, wherein the impermissible state transition comprises one of:
a red state and a prior classification state of the traffic signal device was a green state;
a yellow state and a prior classification state of the traffic signal device was a red state; and
a green state and a prior classification state of the traffic signal device was a yellow state.

9. The method of claim 1, wherein:
the intersection comprises a plurality of traffic signal devices with multi-light states;
identifying that the classification state determined by the TLC is a classification error comprises, by the processor:
- detecting that the classification state generated by the TLC is a multi-light classification state,
- determining multi-light state rules and locations of multi-light traffic signal devices, and
- detecting a classification error of implausible multi-light states by the TLC based on the determined multi-light state rules and the locations of multi-light traffic signal devices.

10. The method of claim 1, wherein:
determining the classification state is repeated for each imminent intersection of a plurality of intersections along a driven path of the vehicle;
the evaluating comprises, by the processor:
- querying a vehicle log for each logged instantiation of the classification state and conditions associated with the classification state for those intersections passed through along the driven path;
- determining those classification states in the vehicle log with at least one condition with low probability of classification; and
- using the determined classification states with the low probability of classification to train the TLC.

11. The method of claim 1, wherein:
the TLC determines the classification state based on a machine learning (ML) algorithm.

12. The method of claim 1, wherein:
the classifying is repeated for each intersection along a driven path of the vehicle;
the classifying creates a plurality of classification states that may be generated by the TLC; and
the evaluating comprises, by the processor, one or more of any of the following:
(i) evaluating the plurality of classification states for temporally inconsistent traffic light transitions of the traffic signal face for a first performance evaluation period of time,
(ii) evaluating the plurality of classification states stored in a vehicle log for those stored classification states with a low probability of classification,
(iii) evaluating the plurality of classification states for a classification error of implausible multi-light states based on multi-light state rules and locations of multi-light traffic signal devices, (iv) evaluating the plurality of classification states for an impermissible state transition of the traffic signal face, (v) evaluating the plurality of classification states for a fraction of time redundant faces of a plurality of traffic signal devices of the intersection which have inconsistent classification states during a second performance evaluation period of time, or (vi) evaluating discrepancies between a respective one classification state of the vehicle relative to a respective one classification state of a second vehicle in proximity to the vehicle and the intersection, the discrepancies being based on captured digital images with overlapping fields of view from the vehicle and the second vehicle.

13. The method of claim 12, further comprising, by the processor:

fusing results of the evaluating (i)-(vi) of the performance of the TLC into one or more metrics; and providing the one or more metrics to a TLC trainer to refine training of the TLC.

14. The method of claim 1, wherein the classification state of the traffic signal face includes a classification state selected from at least one operational state of:

a green light state;
a yellow light state;
a red light state;
a circular light state;
a left arrow light state;
a right arrow light state;
a forward arrow light state;
a flashing yellow light state; and
a flashing red light state.

15. A system for a vehicle, the system comprising:

a computer vision system of a vehicle, the computer vision system configured to receive at least one digital image of a traffic signal device of an intersection, wherein the traffic signal device comprises a traffic signal face including one or more traffic signal elements;

a processor; and a memory containing programming instructions that are configured to instruct the processor to:
receive the at least one digital image,
implement a traffic light classifier (TLC) to determine a classification state of the traffic signal face based on the received at least one digital image,
evaluate a performance of the determining of the classification state by the TLC by applying one or more performance evaluator metrics to the classification state and without using labeled data from the at least one digital image,
identify, in the evaluating, that the classification state determined by the TLC is a classification error,
generate label data for the at least one digital image based on the identified classification error;
relabel the at least one digital image based on the generated label data, and
use the relabeled digital image to refine training of the TLC.

16. The system of claim 15, wherein:

the intersection comprises a plurality of traffic signal devices; and the processor is further configured to, when evaluating the performance:

detect, in a sequence of a plurality of digital images of the traffic signal device, disallowed sequences of the plurality of digital images having temporally inconsistent traffic light transitions for a performance evaluation period of time, calculate disallowed sequences of the temporally inconsistent traffic light transitions, calculate a total number of all transition sequences detected of the plurality of digital images, and normalize the disallowed sequences relative to the total number of all transition sequences; and the processor is further configured to, use the normalized disallowed sequences to train the TLC.

17. The system of claim 15, wherein:

the at least one digital image comprises at least one digital image from each camera of a plurality of cameras on-board the vehicle;

two or more cameras of the plurality of cameras have fields of view which overlap; and the processor is further configured to, when evaluating the performance, cause the TLC to assign a same classification state to each instantiation of each digital image of the traffic signal face from the two or more cameras having the overlapping fields of view.

18. The system of claim 15, wherein:

the processor is further configured to, when evaluating the performance:

determine whether the classification state by the TLC was an impermissible state transition, and identify that the classification state was impermissible; and the processor is further configured to use the identified impermissible classification state to train the TLC.

19. The system of claim 18, wherein the impermissible state transition comprises one of:

a red state and a prior classification state of the traffic signal device was a green state;

a yellow state and a prior classification state of the traffic signal device was a red state; and a green state and a prior classification state of the traffic signal device was a yellow state.

20. The system of claim 15, wherein:

the intersection comprises a plurality of traffic signal devices with multi-light states;

the processor is further configured to, when evaluating the performance:

detect that the classification state generated by the TLC is a multi-light classification state, determine multi-light state rules and locations of multi-light traffic signal devices, and detect a classification error of implausible multi-light states by the TLC based on the determined multi-light state rules and the locations of multi-light traffic signal devices; and the processor is further configured to use the detected classification error to train the TLC.

21. The system of claim 15, wherein:

the processor is further configured to, when determining the classification state, repeating the determining for each imminent intersection of a plurality of imminent intersections along a driven path of the vehicle;

the processor is further configured to, when evaluating the performance:

query a vehicle log for each logged instantiation of the classification state and conditions associated with the classification state for those intersections passed through along the driven path, and determine those classification states in the vehicle log with at least one condition with low probability of classification; and the processor is further configured to use the determined classification states with the low probability of classification to train the TLC.

22. The system of claim 15, wherein:

the TLC is configured to determine the classification state based on a machine learning (ML) algorithm.

23. The system of claim 15, wherein:

the processor is further configured to, when determining the classification state, repeating the determining for each intersection along a driven path of the vehicle, thus creating a plurality of classification states; and the processor is further configured to, when evaluating the performance of the TLC, perform one or more of the following:

(i) evaluate the plurality of classification states for temporally inconsistent traffic light transitions of the traffic signal face for a first performance evaluation period of time, (ii) evaluate the plurality of classification states stored in a vehicle log for those stored classification states with a low probability of classification, (iii) evaluate the plurality of classification states for a classification error of implausible multi-light states based on multi-light state rules and locations of multi-light traffic signal devices, (iv) evaluate the plurality of classification states for an impermissible state transition of the traffic signal face, (v) evaluate the plurality of classification states for a fraction of time redundant faces of a plurality of traffic signal devices of the intersection which have inconsistent classification states during a second performance evaluation period of time, or (vi) evaluate discrepancies between a respective one classification state of the vehicle relative to a respective one classification state of a second vehicle in proximity to the vehicle and the intersection, the discrepancies being based on captured digital images with overlapping fields of view from the vehicle and the second vehicle.

\* \* \* \* \*